FIG. 2

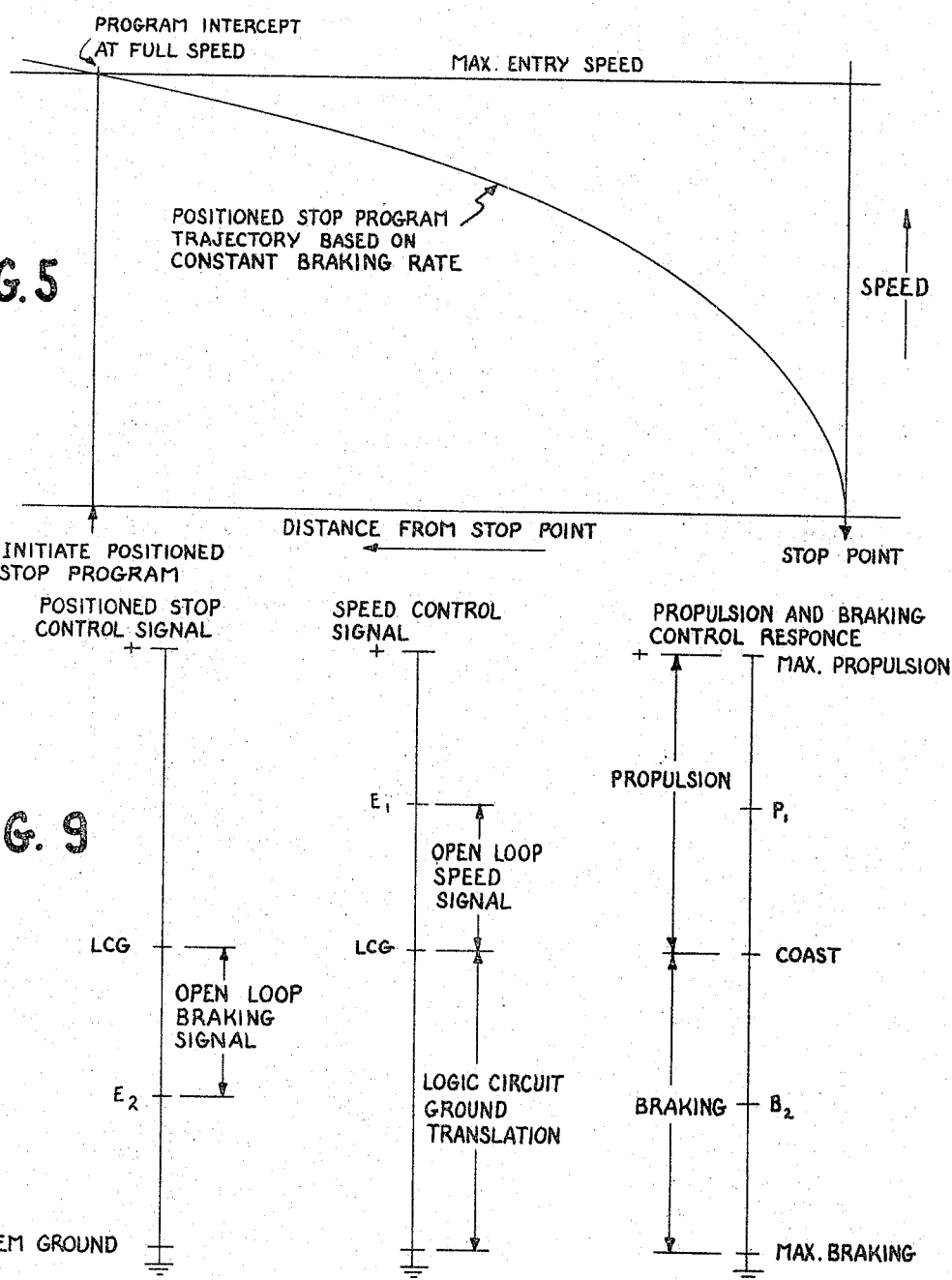

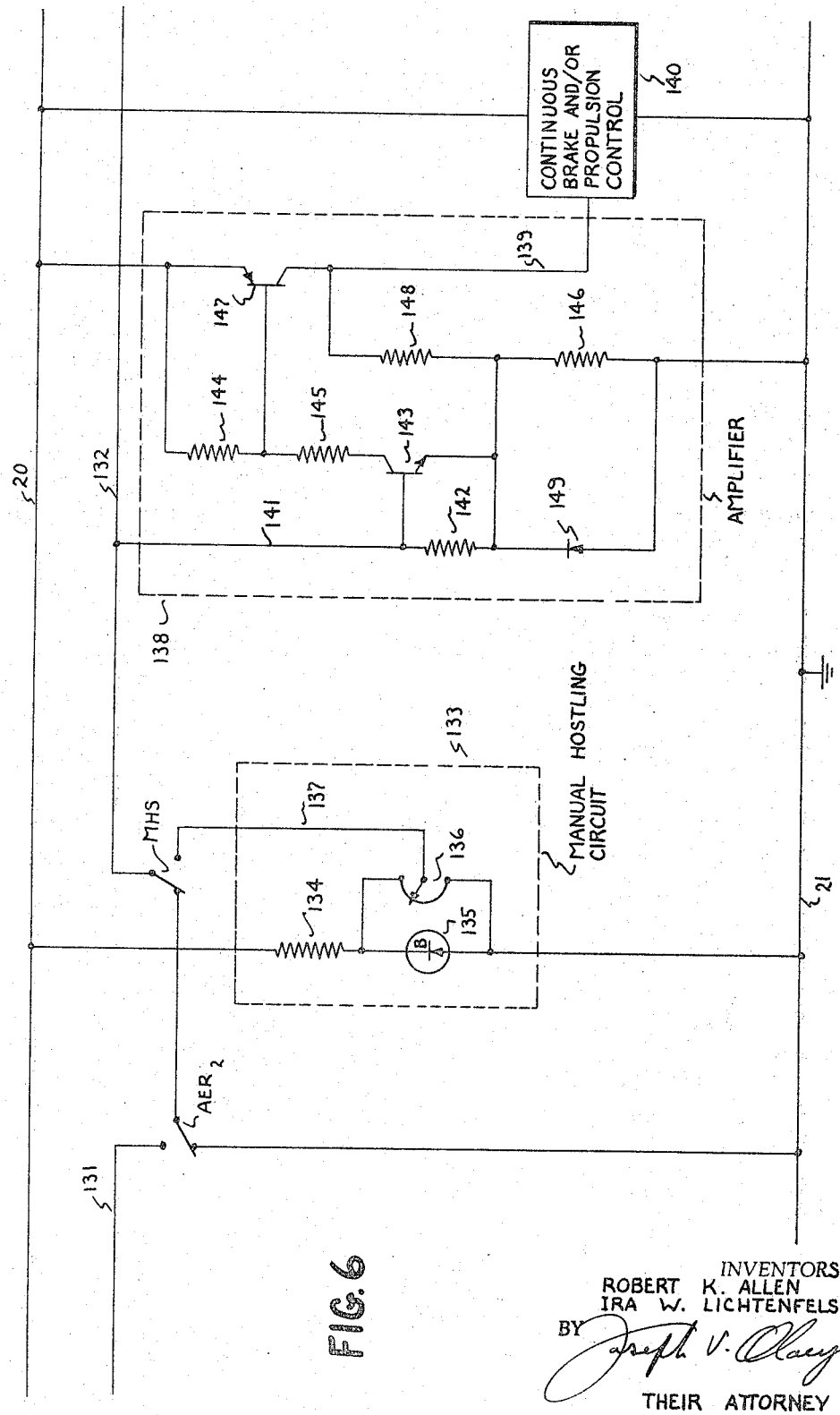

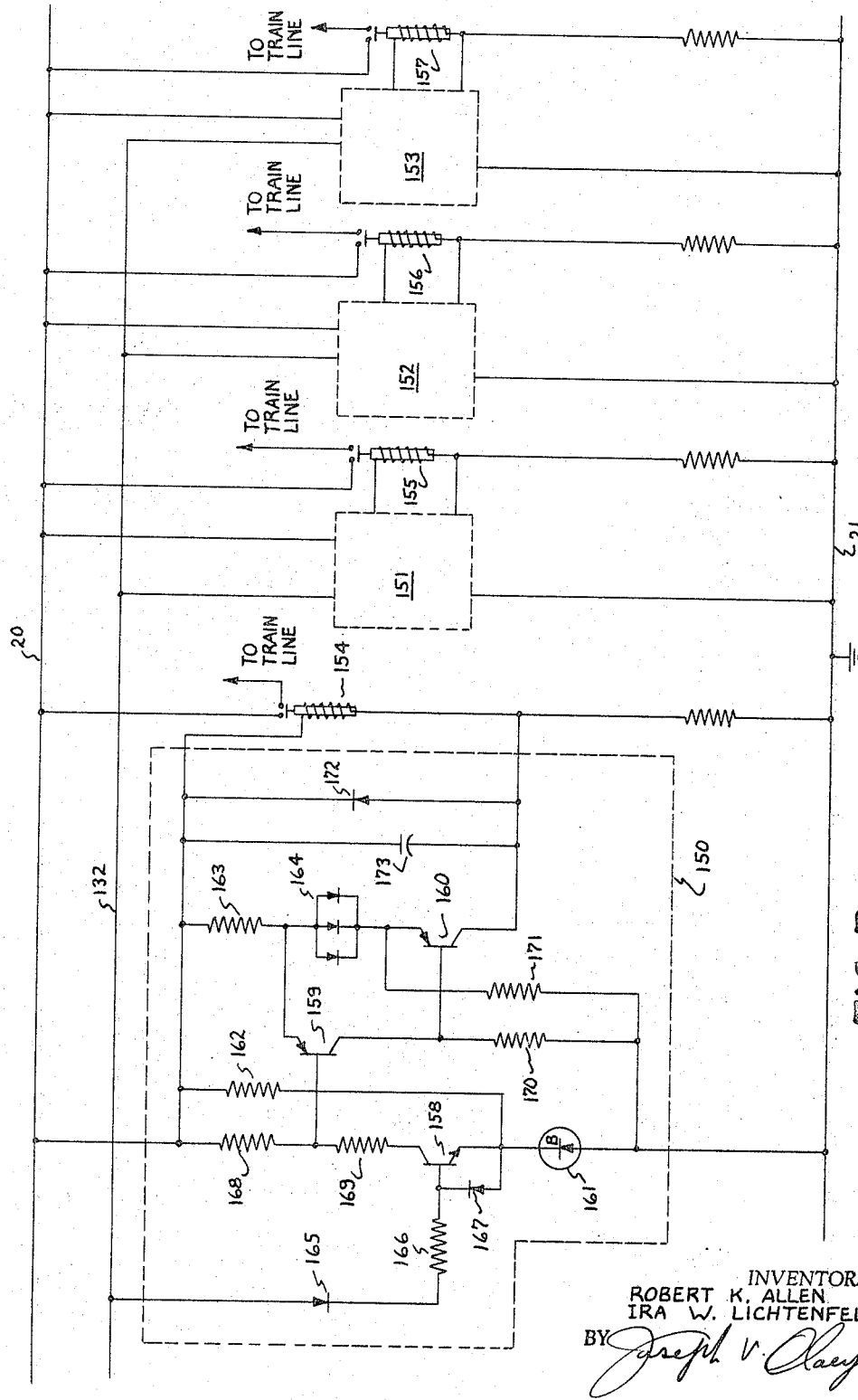

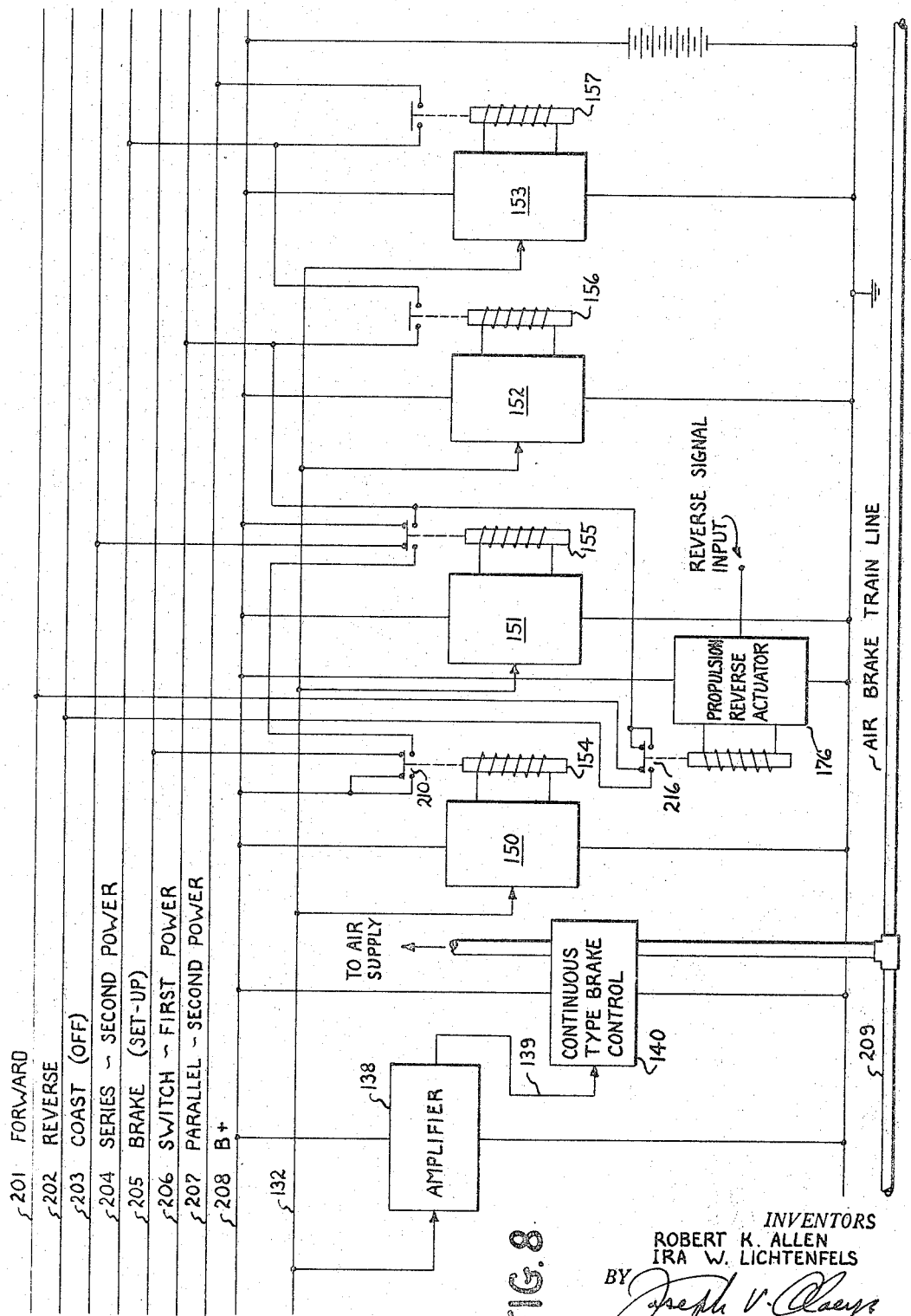

3,334,224
AUTOMATIC CONTROL SYSTEM FOR VEHICLES

Robert K. Allen and Ira W. Lichtenfels, Erie, Pa., assignors to General Electric Company, a corporation of New York
Filed Dec. 14, 1964, Ser. No. 418,132
32 Claims. (Cl. 246—187)

This invention relates to automatic control systems for vehicles and has particular application to rapid transit and other railway systems.

In the past the operation and control of railway and urban rapid transit vehicles has been accomplished primarily by manual means with an onboard operator visually observing wayside signals, track and station conditions and controlling the tractive and braking efforts of the vehicle accordingly. While some functions of an emergency or override nature have been accomplished automatically, the operation of the train or transit vehicle itself has been primarily subject to the manual control of the operator.

With the increasing demands being placed on urban rapid transit and other railway systems, there has been a growing need for the fully automatic operation of such systems. This has evolved from several factors including, for example, the fact that the increasing complexities of high performance transit systems has begun to tax the capabilities of human operators to provide for optimum operation of such systems at the full level of system capability and within the stringent safety requirements necessarily imposed.

However, fully automatic operation of such systems gives rise to serious technical problems. In the case of urban rapid transit systems a predominant requirement overriding all other factors is that of passenger safety. Thus, there is imposed on the system the absolute need for fail safe operation. Passenger comfort must also be taken into account, particularly in regard to permissible acceleration and deceleration rates which can be accepted, as well as the need for smoothness in the train running and stopping controls which are determined by the time rate of change of acceleration and deceleration. In addition, there are a number of other factors, such as track or roadbed conditions, train separation or traffic conditions and the particular requirements associated with individual station stops—all of which must be taken into account and provided for automatically in the operation of any such system. In spite of these and other pressing technical problems associated with the automatic operation of railway and rapid transit vehicles, there is a growing need for such systems as has been explained above.

Accordingly, it is an object of this invention to provide an improved automatic control system for vehicles applicable primarily to railway vehicles and particularly to urban rapid transit systems which will function in response to wayside command signals to operate the vehicle automatically in all of its normal modes of operation in a fail-safe manner.

It is another object of this invention to provide a system wherein the starting, running and stopping of a rail vehicle is controlled automatically and in accordance with the full capabilities of the braking and propulsion system utilized therewith.

It is a further object of this invention to provide an automatic control system for vehicles wherein computing and regulating apparatus, as well as wayside condition sensing apparatus, is vehicle-carried as distinguished from systems wherein the vehicle is a slave to wayside command signals.

It is still another object of this invention to provide an automatic control system for vehicles adapted to provide for high operating performance together with a desired level of passenger comfort.

Briefly stated, in accordance with one aspect of this invention, a system is provided employing vehicle carried apparatus for automatically operating the vehicle in accordance with each of a number of received command signals. The command signals are transmitted from wayside and may be selected in accordance with local track and traffic conditions or, in accordance with traffic conditions only, depending upon the type of vehicle separation system employed.

Accordingly, means are provided for establishing specific speed reference signals from signals received from wayside. Means are also provided for developing a signal representative of the actual speed of the vehicle and, by comparison of the actual speed signal with the reference speed signal, developing a speed error signal. Means are further provided for generating open loop speed signals, in response to the received signals, for scheduling vehicle traction to maintain the reference speed under nominal conditions. Finally, means are provided for causing the vehicle traction to be modulated about the open loop signal level to maintain the reference speed under operating conditions.

The system also includes means actuated by a received wayside signal for causing a preselected speed-distance program signal to be generated and also causing the generation of a signal representing the actual distance of the vehicle to a desired stopping point, the comparison of which produces a distance-error signal. Means are further provided for generating an open-loop braking rate signal adapted to schedule vehicle traction to stop the vehicle at the desired point under nominal conditions with means also provided to cause the vehicle traction to be modulated about the open-loop level to effect stopping of the vehicle at the desired point under actual operating conditions.

As used throughout the specification and in the appended claims, the term "traction" is intended to include both "positive traction," or propulsion effort, and "negative traction," or braking effort.

The novel features believed characteristic of this invention are set forth with particularity in the appended claims. The organization and manner of operation of the invention, together with further objects and advantages thereof, may best be understood by reference to the following description taken in connection with the accompanying drawings in which:

FIG. 2 is a diagram of another portion of the system illustrating the station program receiver arrangement and the speed sensing and tachometer integrity systems;

FIG. 5 is a curve representing an elementary speed-distance program;

FIG. 6 illustrates the manual hostling control and the output circuitry of the running and stopping control system as applied through an output amplifier to a continuous type power and braking selector system;

FIG. 7 illustrates an output circuit arrangement which may be used either alternatively or in conjunction with the output arrangement illustrated in FIG. 4 and which is applied to the discrete type propulsion and braking system;

FIG. 8 is a simplified schematic circuit diagram illustrating adaptation of the system of this invention to control presently utilized propulsion and braking apparatus in conjunction with the conventional "train lines";

FIG. 9 is a diagrammatic representation illustrating the relationship between the various control signals and the braking and/or propulsion response thereto;

FIG. 11 illustrates the manner in which FIGS. 1, 2, 3, 4, 6, 7 and 10 may be arranged to provide a complete schematic circuit diagram of a specific embodiment of this invention.

Figure 1:
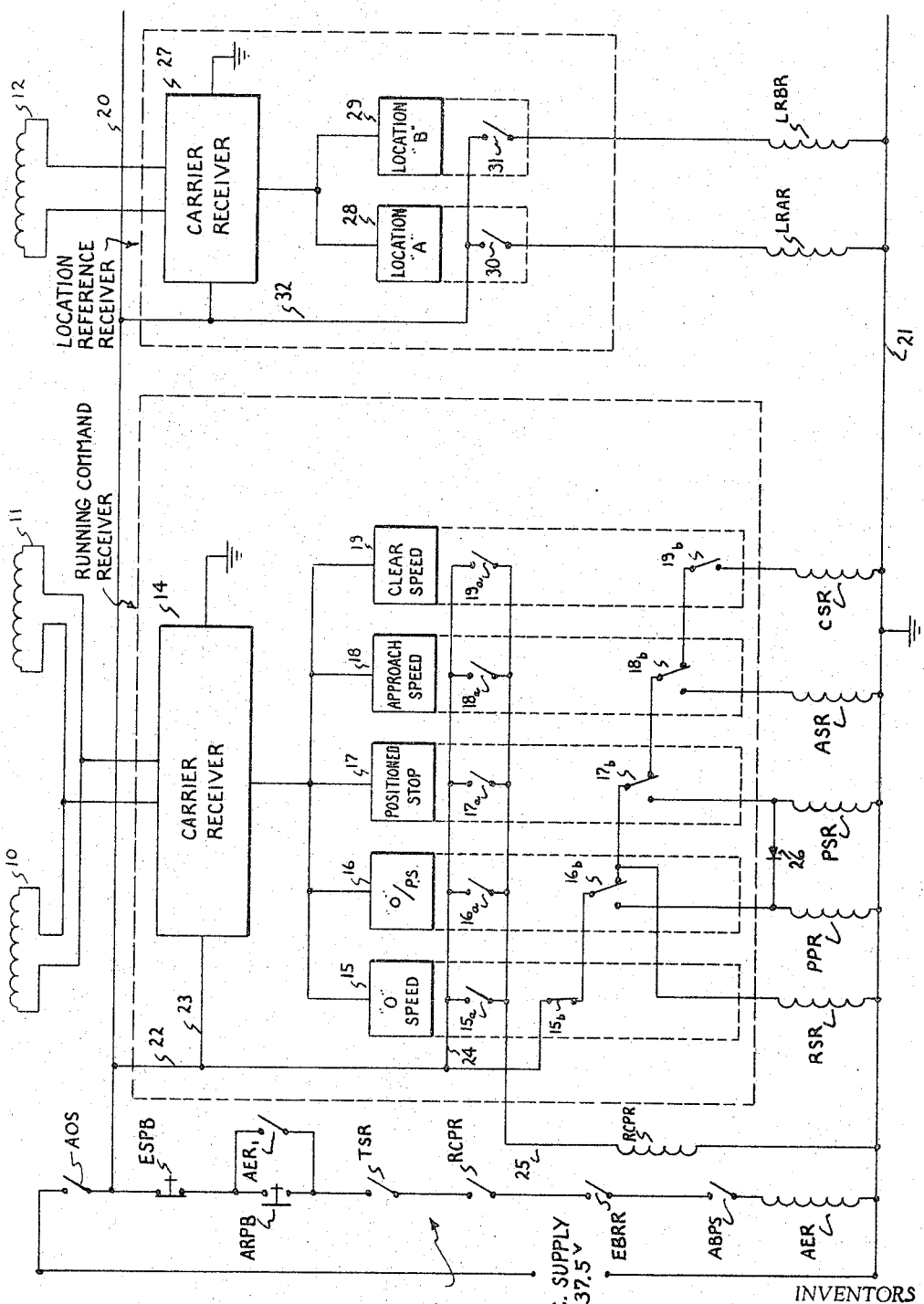
FIG. 1 is a circuit diagram of a portion of an automatic rapid transit control system embodying this invention and illustrating a simplified emergency circuit, as well as the running command and the location reference receiver systems.

Inasmuch as the following description of a specific embodiment of the invention is of considerable length and is necessarily divided into a number of separate functional sections, the various sectional headings are serially numbered and listed below in order to facilitate immediate reference to the various portions of the specification.

| | Col. |
|---|---|
| (1) General Description of System | 3 |
| (2) Emergency Circuitry | 4 |
| (3) Operation Command Receivers | 5 |
| (4) Running Command Receiver | 5 |
| (5) Location Reference Receiver | 7 |
| (6) Station Program Receiver | 7 |
| (7) Speed-sensing Circuitry | 8 |
| (8) Tachometer Integrity Circuitry | 8 |
| (9) No-motion Detector | 10 |
| (10) Speed-error Signal and Translating Circuitry | 10 |
| (11) Positioned-stop Circuitry | 12 |
| (12) Distance - error Signal and Translating Circuitry | 15 |
| (13) Manual Hostling Circuitry | 16 |
| (14) Braking and Propulsion Controls | 17 |
| (15) Station Program Actuators | 22 |

*General description*

In accordance with a specific embodiment of this invention, a control system is provided on board the railway vehicle which responds to various preselected command signals transmitted from wayside equipment in any suitable manner, such as by tone signal generators or the like. For normal running operation, a speed signal command representing a desired operating speed is received on board the vehicle from the wayside equipment to establish an on-board speed reference signal corresponding to the command speed. The vehicle speed is measured by the on-board control and compared with the reference speed signal to develop an error signal proportional to the difference between the actual operating speed of the vehicle and the desired operating speed.

This speed error signal, which of course may be either positive or negative, is then translated such that the range of error signals to which the system is set to respond is positive with respect to system ground or zero potential level. The normal zero speed error signal magnitude thus, in fact becomes some preselected positive level above the system ground whereas speed errors in the negative direction, indicating speeds in excess of reference speed, drive the translated error signal in the direction of system ground potential. There is thus established in the control a so-called logic circuit ground about which control computations are performed and which is at some preselected positive level above control system ground. The propulsion and braking control systems are controlled in response to error signals with full braking effort being applied as the translated error signal approaches the zero or system ground level corresponding to a large positive excess speed error. The translation of the speed error signal thus provides a fail-safe feature in that a loss of power in the control results in a zero output potential calling for full braking effort. The system therefore fails in the direction of stopping the vehicle.

In addition to the foregoing translation, and before applying the translated error signal to the propulsion or braking control, an additional translation in the form of an open loop signal is provided which is of a magnitude preselected on the basis of the wayside performance command received by the vehicle control. This open loop signal is representative of a preselected level of braking or tractive effort based on the operating condition being called for by the wayside command. Assume, for example, that the wayside signal calls for a vehicle speed of 30 miles per hour. In response to this command, the control system, in addition to performing the functions listed above, selects an open loop signal which, on the basis of preselected normal conditions, schedules a tractive effort approximating that required to maintain the desired vehicle speed of 30 miles per hour. This greatly reduces the response requirements imposed on the speed and braking control loops and has a number of advantages which will be discussed later on in detail. The first translation referred to above, that of moving the entire error signal range on the positive side of system ground to establish an elevated logic circuit ground, is also imposed on the open loop signals so that the fail-safe feature is retained.

In addition to the running control, which responds to wayside commands to set and maintain various levels of vehicle speed, the control provides also a programmed positioned stop function for bringing the vehicle to a scheduled stop in accordance with a preselected speed-distance profile. The positioned stop control is also provided with open loop signal generating means for scheduling a preselected braking effort based on following the selected speed distance stopping profile under normal conditions. In addition, the positioned stop error and open loop signals are translated above system ground to the logic circuit ground level for fail-safe operation in the manner heretofore explained.

Means are also provided in the on-board control for sensing the presence or absence of a wayside command signal. This system operates to schedule an emergency stop upon a failure in the continuity of the running command presence signal. This system is itself also arranged to fail safe in the event of a power loss or other malfunction.

There are a number of other features and advantages of the invention which require further elaboration in the way of system details before they can be adequately explained and, accordingly, these features and advantages will be treated in the detailed description which follows.

It should also be understood that it has not been possible to set out fully in the foregoing brief general description of this invention all of the various operating advantages of the particular features which are noted, nor the full impact of the technical environment in which they reside. The foregoing is intended, therefore, only as a brief description of a particular form of the invention set out in highlight fashion and should not be viewed in a limited sense.

*Emergency circuitry—(FIG. 1)*

Control power from a D-C power supply is supplied to the system over the lines 20 and 21 through an automatic operation master switch AOS and an emergency circuit. The emergency circuit may be of any suitable type and is shown in a very simplified form as comprising a number of serially connected contacts each associated with a particular elementary function which must be monitored. The serially connected contacts are illustrated in the positions which they occupy when their relay coils are in their de-energized condition. This emergency circuit is not to be confused with the usual emergency circuit in manually operated vehicles. This emergency circuit includes the additional functions to be checked in the automatic control system, the loss of which would indicate an unsafe operating condition. The emergency circuit is arranged, therefore, so that tripping thereof brings the vehicle to a full brake stop.

As shown, the emergency circuit comprises, in series connection, an emergency stop push button ESPB, the parallel connection of an automatic operation emergency relay contact $AER_1$ and an automatic operation release push button ARPB, a tachometer security relay contact TSR, a running command presence relay contact RCPR, an electric brake control pressure ready relay contact EBRR, an air brake minimum pressure switch ABPS, and an automatic operation emergency relay coil AER. With the exception of the automatic operation release push button ARPB, all of the contacts in the foregoing series circuit are closed under normal operating conditions such that the opening of any of these contacts interrupts the circuit continuity of the emergency circuit to de-energize the automatic operation emergency relay coil AER, thereby opening its associated contact $AER_1$ to lock the circuit in the open condition. The automatic operation emergency relay then operates through its other contacts to stop the train in a manner hereinafter described. For the particular system illustrated, the power supply voltage is indicated as being approximately 37.5 volts. It will be understood, however, that any other suitable voltage may be used.

*Operation command receivers—(FIGS. 1 and 2)*

Figure 2:
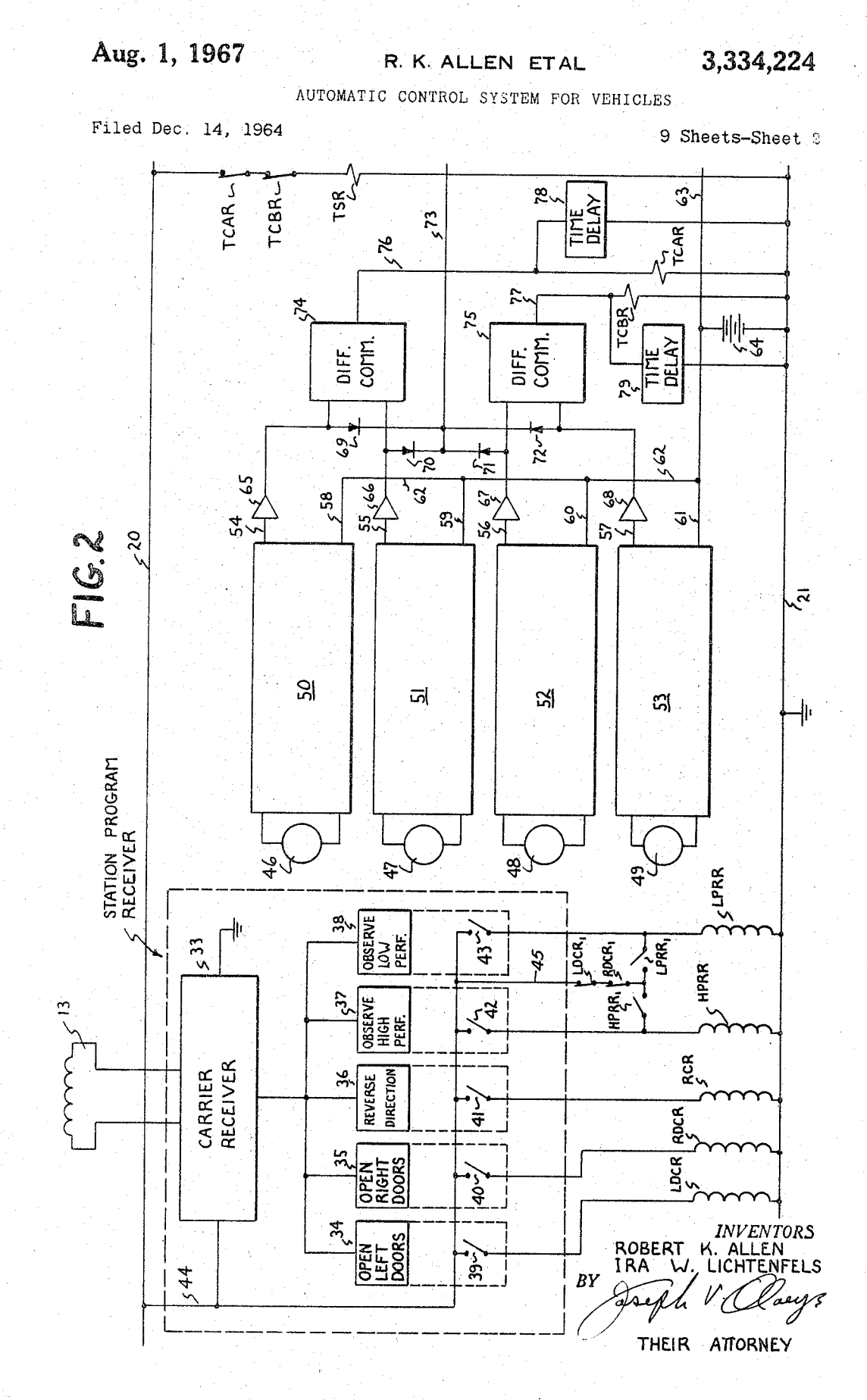

The operation command receiver circuits are shown in FIGS. 1 and 2 wherein the running command and location reference receiver portions are illustrated in FIG. 1 and the station program receiver portion is illustrated in FIG. 2. For purposes of describing a specific embodiment of this invention a wayside signal system of the tone modulated carrier type has been selected. It will be understood, however, that various other signal systems are suitable for use in this invention. In the tone modulated carrier system shown, the different tone frequencies are selected to specify preselected operating commands.

Each of the receiver portions of the system is illustrated as having a signal coupling device associated therewith which is indicated schematically as a coil. This schematic representation, therefore, is intended to denote a signal coupling device generally which may be an antenna, pickup coil, or any other such device suitable for receiving the signals transmitted from wayside. The choice of the particular type of signal coupling device employed will usually depend upon the type of communication system employed.

As shown, the system is provided with running command pickups 10 and 11 located on board the train and arranged to receive running command signals from the wayside signal equipment. The system is also provided with one or more location reference pickups 12 and, as illustrated in FIG. 2, one or more station program pickups 13 for receiving signals relating to particular locations and station programs, respectively.

*Running command receiver*

The tone modulated carrier received by the running command pickups 10 and 11 is connected into a carrier receiver 14. The output of the carrier receiver is connected, as shown, to a plurality of selectors 15, 16, 17, 18 and 19, each of which is responsive to a preselected tone modulation frequency to specify a particular train operation condition. For example, when frequency modulation is employed the receiver would be provided with an input filter which passes only the desired frequencies which are then amplified, limited, and fed to a discriminator where the audio frequency component (tone) is recovered in well-known manner. This audio frequency tone then operates the tone selector whose output is a relay.

In the particular arrangement selected for illustration, the selector 15 responds to a ZERO SPEED tone, selector 16 to a ZERO SPEED PLUS POSITIONED STOP tone, selector 17 to a POSITIONED STOP tone, selector 18 to the APPROACH SPEED tone, and selector 19 to the CLEAR SPEED tone. It will be appreciated, of course, that a representative set of train operating conditions has been chosen merely for illustration and description purposes and that various other running command signals may be provided for. For example, running command selectors could be provided for various levels of operating speed, say the steps of 30, 50 and 70 miles per hour, in addition to the two operating speeds of APPROACH SPEED and CLEAR SPEED which have been illustrated. It will also be appreciated that the signal equipment such as carrier receiver 14 and the selectors 15 through 19 are well known in the art and are, therefore, not described in any detail but rather are presented in block diagram form in the interests of simplifying the description of the invention.

Each of the selectors 15 through 19 is connected to actuate, upon receipt of its preselected tone signal, a set of contacts associated with it as identified by the dotted line enclosures illustrated with each of the selectors. That is, selector 15 actuates contacts 15a and 15b, selector 16 contacts 16a and 16b, selector 17 contacts 17a and 17b, selector 18 contacts 18a and 18b, and selector 19 contacts 19a and 19b.

Control power is connected to carrier receiver 14 through lines 22 and 23 to one side of the contacts 15a, 16a, 17a, 18a and 19a through lines 22 and 24. The opposite side of the parallel connected contacts 15a through 19a is connected through a common lead 25 to the running command presence relay coil RCPR as shown. It should be noted at this point that the various relays and their associated contacts have been identified by letter abbreviative of their functions, such as for example RCPR for the running command presence relay. Where one relay operates more than one set of contacts, numerals have been added to the letter designations on the contacts to differentiate between the different sets of contacts for descriptive purposes.

As indicated above, control power is connectible through the selector contacts 15a through 19a to the running command presence relay coil RCPR. It will thus be observed that one of the selector contacts 15a through 19a must be in its closed or actuated position indicating receipt of a running command tone in order to energize the running command presence relay coil RCPR and hold its associated contacts in the series emergency circuit in the closed position. The absence of a running command signal therefore drops out the running command presence relay RCPR and de-energizes the automatic operation emergency relay to stop the train.

The selectors 15 through 19 are also connected to actuate contacts 15b through 19b which in turn control the energization of the various running command relays, which are respectively the remove stop relay RSR, the positioned stop program relay PPR, the positioned stop relay PSR, the approach speed relay ASR, and the clear speed relay CSR. It will be observed that with AOS closed, the remove stop relay RSR is in a normally energized condition and, as will be explained later, this relay must remain energized.

Also, it will be observed that the contacts 15b through 19b are connected in a priority interlocked fashion with ZERO SPEED having first priority, then ZERO/POSITIONED STOP, then POSITIONED STOP, then APPROACH SPEED, and finally CLEAR SPEED. In other words, if a zero speed tone is received by zero speed selector 15, the contact 15a is closed and the contact 15b is opened. The opening of contact 15b operates to de-energize remove stop relay RSR and at the same time remove the power connection from contacts 16b, 17b, 18b and 19b so that these higher order operating conditions cannot be implemented even though a tone is received by one of the selectors 16 through 19. Similarly, if the zero/positioned stop selector 16 is energized to move contact 16b to the position energizing the positioned stop program relay 16b, control power is thereby simultaneously cut off from contacts 17b, 18b and 19b so that relays PSR, ASR and CSR cannot be energized. The same hierarchy is observed on up the priority ladder such that if contact 17b is moved to energize PSR, then ASR and CSR cannot be energized, and if 18b is moved to energize ASR, then CSR cannot be energized. This provides redundancy to guard against a failure of the type wherein a higher order selector may receive a tone simultaneously with a lower order selector. For fail-safe operation the lower order, therefore, is arranged to take precedence.

It will be observed that relay coils PPR and PSR are interconnected by a diode 26 such that if PSR is energized by movement of contact 17b, then PPR is also energized. However, if PPR is energized by actuation of contact 16b, PSR is not energized because of the blocking effect of diode 26. The purpose of this interconnection will be explained later on. It will also be noted that contacts 15b and 16b are connected in series through the remove stop relay coil RSR so that actuation of either of these contacts de-energizes RSR. Actuation of contact 16b also energizes PPR, the function of which will be explained later.

*Location reference receiver—(FIG. 1)*

Location reference pickup 12 is connected to a second carrier receiver 27 which is in turn connected to selectors 28 and 29 set to respond to reference signals specifying reference distance markers based on particular location conditions. Here again, there may be any number of location reference selectors depending on how many location references are required for train operation. For example, these reference marker signals are not essential to the operation of the system but are employed to improve the stopping accuracy. Thus, the number employed will depend upon the stop accuracy desired and the maximum entry speed, that is, the distance to be covered in making the stop. For purposes of description, two such selectors have been shown, one being a location A reference selector 28 and the other being a location B reference selector 29 as illustrated.

The two selectors 28 and 29 are connected to actuate respectively contacts 30 and 31 which in turn are connected to power supply line 20 through lead 32 to energize respectively a location reference A relay LRAR and a location reference B relay LRBR as shown. In other words, the receipt of a location reference A tone closes contact 30 to energize LRAR and receipt of a location reference B tone closes contact 31 to energize LRBR. The effect on train operation of energization of LRAR or LRBR will be explained later on.

*Station program receiver—(FIG. 2)*

Referring now to FIG. 2, the station program pickup 13 is connected to a third carrier receiver 33 which is in turn connected to station program selectors which are responsive respectively to tone commands of "OPEN LEFT DOORS," "OPEN RIGHT DOORS," "REVERSE DIRECTION," "OBSERVE HIGH PERFORMANCE," and "OBSERVE LOW PERFORMANCE." Here again, the number of station command tones and corresponding selectors is chosen merely on a representative basis and any number of command tones and selectors may be utilized.

The station command selectors 34 through 38 are arranged to actuate respectively contacts 39, 40, 41, 42 and 43 which are all connected to control power line 20 through lead 44. Contacts 39 through 43 are in turn connected as shown to energize respectively the left door control relay LDCR, the right door control relay RDCR, the reverser control relay RCR, the high performance request relay HPRR, and the low performance request relay LPRR.

Connected to the power supply through leads 44 and 45 are the left door control relay contact $LDCR_1$ and the right door control relay contact $RDCR_1$. This circuit is in turn connected as shown through one leg containing high performance request relay contact $HPRR_1$ to the high performance request relay HPRR, and through a second leg containing low performance request relay contact $LPRR_1$ to the low performance request relay LPRR. Here again, all contacts are illustrated with the demodulators and relays in the de-energized condition.

The circuit just described provides for memory storage of the high performance and low performance commands between stations, which memory is automatically erased by door operation at each station. Assume for example that high performance command selector 37 is actuated upon leaving a station, thereby closing contact 42 and energizing high performance request relay HPRR. Energization of HPRR closes $HPRR_1$ to look HPRR through the left and right door control relay contacts $LDCR_1$ and $RDCR_1$. As long as $LDCR_1$ and $RDCR_1$ remain closed, HPRR will remain energized. Upon stopping at the next station, either the left or right door control relays will be energized by the selected wayside tone to open either $LDCR_1$ or $RDCR_1$, opening the circuit through and de-energizing HPRR. Then, as the train leaves that station, it is again set by the appropriate local tone signal for either high performance or low performance, which command is locked in and observed until the next station is reached. As shown, the system is arranged so that if normal performance is desired no specific command signal need be sent to the vehicle upon leaving the station. That is, normal performance is provided for unless a signal is received scheduling something different.

*Speed sensing circuitry*

The train speed sensing circuits are also illustrated in FIG. 2. The circuit contains four separate tachometers 46, 47, 48 and 49 which may be axle mounted or otherwise driven from the train propulsion system. Tachometers 46 through 48 are connected into tachometer load circuits 50 through 53 as shown which, in the case of A.-C. tachometers, contain the necessary circuitry for producing a D.-C. voltage output proportional in magnitude to the A.-C. voltage input. Such circuitry is shown, for example, in co-pending application Ser. No. 266,466, filed Mar. 15, 1963 in the name of William B. Zelina, and assigned to the assignee of this application.

There is thus produced at the tachometer output leads 54, 55, 56 and 57 a D.-C. voltage proportional to tachometer speed and hence proportional to vehicle speed. Tachometer ground leads 58, 59, 60 and 61 are connected through a common lead 62 to a logic circuit lead 63, which is in turn biased to some preselected voltage level above system ground 21 in any suitable manner, such as by means of a D.-C. voltage source shown schematically as a battery 64. The significance of the elevated logic circuit ground 63 will be explained in further detail later.

The tachometer output signals are taken through amplifiers 65, 66, 67 and 68 and diodes 69, 70, 71 and 72 to a common tachometer output lead 73. The diode output connections avoid loading problems between the tachometer circuits connected into the common output.

*Tachometer integrity circuitry*

The tachometer outputs from amplifiers 65 and 66 are also connected into a differential comparator circuit 74 while the outputs from amplifiers 67 and 68 are connected into a second differential comparator 75. The differential comparators compare the two voltages fed into them and produce an output signal respectively at 76 and 77 proportional to the difference in input voltages. In other words, comparator 74 produces an output at 76 proportional to any difference in output voltage between tachometers 46 and 47, while comparator 75 produces an output at 77 proportional to any difference in output voltage between tachometers 48 and 49. Circuitry for performing the function of comparators 74 and 75 is well known and will therefore not be described in detail. It will be understood that suitable means are ordinarily provided to compensate for differences in the outputs of the different tachometers as a result of small variations in wheel diameters or the like.

Under normal conditions with all tachometers running at the same speed, all tachometer output signals should be equal and hence the outputs of both comparators 76 and 77 would be zero. However, in the event of a failure of one of the tachometers or its associated output circuitry resulting in a loss of output signal, a signal unbalance is produced at the input of the differential comparator which is connected to the failed circuit and an output signal is accordingly generated by that comparator. Assume, for example, that tachometer 46 suffers a malfunction such that its output at amplifier 65 goes to zero. The output of tachometer 47 at amplifier 66 thus produces a signal unbalance in differential comparator 74, thereby producing a signal at the output 76 of the comparator. Similarly, a failure in either tachometer 48 or tachometer 49 will produce a differential input to comparator 75 and hence an output signal at 77.

The comparator outputs 76 and 77 are connected respectively to relay coils TCAR and TCBR, designating the tachometer comparator A pair relay and the tachometer comparator B pair relay. Connected across relay coil TCAR is a time delay circuit 78 and connected across relay coil TCBR is a similar time delay circuit 79. This time delay circuits 78 and 79 act to shunt out the relay coils TCAR and TCBR for a preselected time delay period upon the appearance of an output signal from either of the comparators 74 or 75.

The purpose of the time delay in the actuation of relays TCAR and TCBR is to allow momentary differentials in tachometer outputs, such as would occur, for example, in the case of wheel slip resulting from loss of adhesion, without actuating the tachometer security system. The time delay selected for this purpose may typically be in the order of two to three seconds. Upon expiration of the preselected time delay period, the time delay circuits 78 and 79 open to remove the shunt from the relay coils and permit relay actuation if the differential signal persists beyond the permitted time delay period.

Thus, if, for example, a differential should occur between the outputs of tachometers 46 and 47, the differential comparator 74 produces a signal at its output 76 which actuates time delay 78 to shunt out relay TCAR and prevent its actuation. If the differential signal then disappears before the expiration of the time delay period, no actuation of relay TCAR occurs. If the differential signal persists, however, beyond the time delay period, relay TCAR is then actuated by the signal appearing at 76 when the time delay circuit 78 opens.

The tachometer comparator relay contacts TCAR and TCBR are connected in series with the tachometer security relay coil TSR as shown with TCAR and TCBR being normally closed and TSR thus being normally energized. It will be recalled that the contacts of the tachometer security relay TSR are connected in the series emergency circuit illustrated in FIG. 1. De-energization of the tachometer security relay therefore drops out the TSR contacts de-energizing the automatic operation emergency relay AER to stop the train in the event of a tachometer signal unbalance persisting beyond the permitted time delay period.

*No-motion detector—(FIG. 3)*

The no-motion detector circuit comprises two transistors 80 and 81 with the speed proportional signal being applied over line 73 to the circuit through a diode 82 and a resistance 83 to the base of transistor 80. The emitter of transistor 80 is connected to the system ground lead 21 through a breakdown diode device 84, and which presents a very high impedance, essentially an open circuit, at voltages below the breakdown value. Breakdown diode device 84 is biased into its linear region by means of resistance 85 to provide a substantially constant voltage reference which is operative to cause transistor 80 to be reverse biased. Diode 86 is provided to limit the back voltage on the emitter-base junction of the transistor 80 to a desired low value.

The collector circuit of transistor 80 is connected to the power supply line 20 through resistors 87 and 88 which form a divider connected to the base of transistor 81. The emitter of transistor 81 is connected to the power supply 20 through resistor 89. The collector of transistor 81 is connected to a no-motion relay coil NMR as shown.

In operation, as long as the speed signal supplied to the no-motion detector over line 73 is greater than the breakdown voltage of the diode device 84, the base to emitter junction of transistor 80 is biased in the forward direction and transistor 80 is rendered conducting. It should be noted here that the transistor 80 is connected to the system ground 21 whereas the speed proportional signal appearing on line 73 is generated with respect to the logic circuit ground 63. Therefore, a zero speed signal with respect to logic circuit ground 63 still results in a positive signal with respect to system ground 21, that being the amount by which the logic circuit ground 63 is held above the system ground 21.

With transistor 80 in its conducting condition, resistors 87 and 88 act as a voltage divider between the supply voltage at 20 and the system ground 21 to establish a base voltage on transistor 81 to bias its emitter to base junction in the forward direction and render that transistor also conducting. This establishes the circuit through resistor 89 to energize the no-motion relay coil NMR.

The breakdown diode device 84 is chosen so that a voltage level slightly above logic ground causes its breakdown to thereby cause transistor 80 to be rendered conductive to in turn render transistor 81 conductive and cause the no-motion relay coil to be energized. In this way, a small magnitude speed signal on line 73 is operative to cause breakdown of diode device 84 and allow coil NMR to be energized. For example, as long as the train speed is high enough to cause a speed signal to be applied to the no-motion detector over line 73 which is greater than the breakdown voltage of diode device 84, plus the voltage drops of resistance 83 and the base-emitter junction of transistor 80, the no-motion relay coil NMR remains energized. When the train speed drops below that level, however, diode device 84 is in its blocking condition which results in both transistors 80 and 81 being rendered nonconducting and de-energizing no-motion relay coil NMR.

As the train comes to a stop, therefore, the no-motion relay coil NMR is de-energized in the manner just described. The no-motion relay is interlocked into the door actuation, propulsion reversing, and other desired station and/or terminal program functions.

*Speed error signal and translating circuitry—(FIG. 3)*

Figure 3:
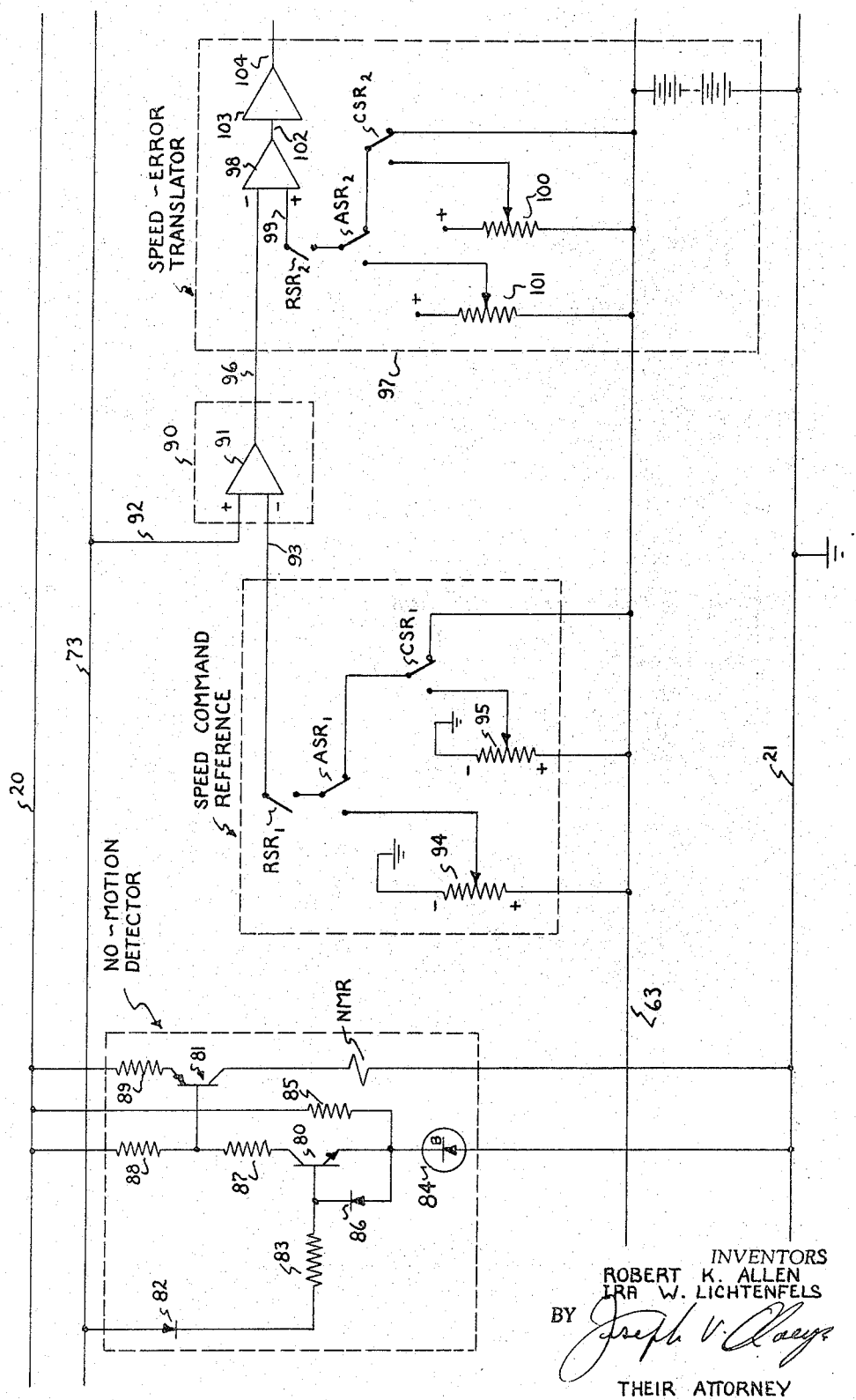
FIG. 3 illustrates the no-motion detector portion of the system along with the speed error signal generating circuitry including the speed error translating means and the open loop speed signal generating means.

Continuing on with the description of the circuitry of FIG. 3, the speed proportional signal 73 is connected into a speed error comparator 90 where it is compared with a speed reference signal to derive a speed error signal. The speed error comparator includes a summing amplifier 91 and the speed proportional signal is connected to one of the amplifier inputs 92, as shown, while a speed reference signal is connected to a second input 93.

In the arrangement shown in FIG. 3, the APPROACH SPEED reference is connected in by the actuation of the approach speed relay contacts $ASR_1$ in response to receipt of a command tone by the approach speed selector 18 of FIG. 1. The clear speed reference is connected in by actuation of the clear speed relay contacts $CSR_1$ in response to receipt of a common tone by the clear speed selector 19.

The speed references are in the form of fixed voltages obtained, in this case, by suitable tap-offs of resistors 94 and 95. The speed reference and speed signals must, of course, be fed into the amplifier 91 in a subtractive sense and in this case the speed signal at input 92 is positive and the speed reference signal at input 93 is negative with respect to logic circuit ground 63, although the speed reference signals are still positive with respect to the control system ground 21. The speed reference signals are connected to the amplifier input 93 through remove stop relay contacts $RSR_1$, which remain closed in the absence of a zero speed or zero/positioned stop signal.

In the illustration of FIG. 3, two reference speeds are shown, corresponding to the two command speeds of APPROACH SPEED and CLEAR SPEED shown in FIG. 1. It should be appreciated, of course, that any number of reference speeds may be selected.

The computational polarities of the speed and speed reference signals are as indicated by the plus and minus signs at the inputs 92 and 93 of amplifier 91, with both signals being positive with respect to control system ground 21. The output 96 of amplifier 91 is, therefore, the difference between the speed signal at input 92 and the speed reference signal at input 93 increased, of course, by the gain of the amplifier. In other words, the signal at 96 is the speed-error signal which is proportional to the difference between actual train speed, as represented by the speed signal at input 92, and the command speed as represented by the reference speed signal at input 93.

Because of the sign reversal produced by amplifier 91, the speed-error signal at amplifier output 96 is opposite in polarity to that generated at its input. Thus, for a speed error in excess of the reference speed, producing a net positive signal at the input to amplifier 91, the output signal at 96 is negative, and vice versa.

The speed error signal 96 is connected to a speed error translator 97 where it is fed in as one input to a summing amplifier 98. Connected to the second input 99 of amplifier 98 is an open loop speed signal in the form of a fixed voltage derived by means of a tap-off from one of the resistors 100 and 101 which are connected to a positive voltage source as shown and to logic circuit ground 63.

The open loop speed signals are selectively connected to amplifier 98 by operation of contacts $ASR_2$ and $CSR_2$ in response, respectively, to actuation of the approach speed relay ASR and the clear speed relay CSR as shown in FIG. 1. Thus, upon receipt of the approach speed command tone by selector 18, the approach speed relay ASR is actuated, thereby operating contacts $ASR_1$ and $ASR_2$ to connect the approach speed reference voltage to input 93 of amplifier 91 and connect the approach speed open loop reference voltage to the input 99 of amplifier 98. The clear speed relay CSR operates in similar fashion to connect in the clear speed reference and clear speed open loop signals through contacts $CSR_1$ and $CSR_2$ upon receipt of the clear speed tone by selector 19.

It should be noted that in the case of the speed reference and open loop signal inputs to amplifiers 91 and 98, a priority of control is established which corresponds to that provided for the running command receiver of FIG. 1 in that the APPROACH SPEED command takes priority over the CLEAR SPEED command. In other words, with contacts $ASR_1$ and $ASR_2$ actuated to the signal position, actuation of $CSR_1$ and $CSR_2$ cannot produce signal inputs to amplifiers 91 and 98.

It will be recalled that the speed error signal at 96 is negative with respect to logic circuit ground 63 for speeds in excess of the reference speed and positive for speeds below the reference speed. The fixed magnitude open loop speed signals applied to input 99 of amplifier 98 are positive with respect to logic system ground 63, thus representing a fixed speed error signal corresponding to an underspeed condition.

It will be understood that but one convenient arrangement of providing sign reversal has been described and a variety of other arrangements may be employed to achieve the same result. For example, the sign reversal may be provided on amplifier 103 by feeding the references at 94 and 95 from a negative voltage supply rather than from ground as shown. Alternatively, the sign change may be provided on input lead 92 by feeding the references 94 and 95 from a positive reference supply and the references 100 and 101 from a negative supply.

Thus, for a zero speed error between actual train speed and the selected reference speed producing a zero error signal at 96, the open loop speed signal applied to amplifier 98 nevertheless schedules a preselected level of tractive effort. The magnitude of the open loop signal is selected so as to maintain the approximate reference speed under nominal operating conditions with the speed error signal providing for adjustment of tractive effort about this level. The open loop speed signals are, of course, different for the different command speeds with each being selected to approximate the tractive effort required to maintain the particular command speed called for under nominal conditions. The advantages of the translation provided by the introduction of the open loop speed signals will be discussed further in connection with the description of the overall operation of the system. The error signal gain is chosen to produce required train performance and maintain a desired level of passenger comfort.

The output 102 of amplifier 98 is, of course, reversed in polarity from the input and an output amplifier 103 is therefore provided for sign reversal to the proper polarity. The output 104 of amplifier 103 is thus the operating speed error signal which is applied to the propulsion and braking control system.

*Positioned-stop circuitry—(FIG. 4)*

Figure 4:
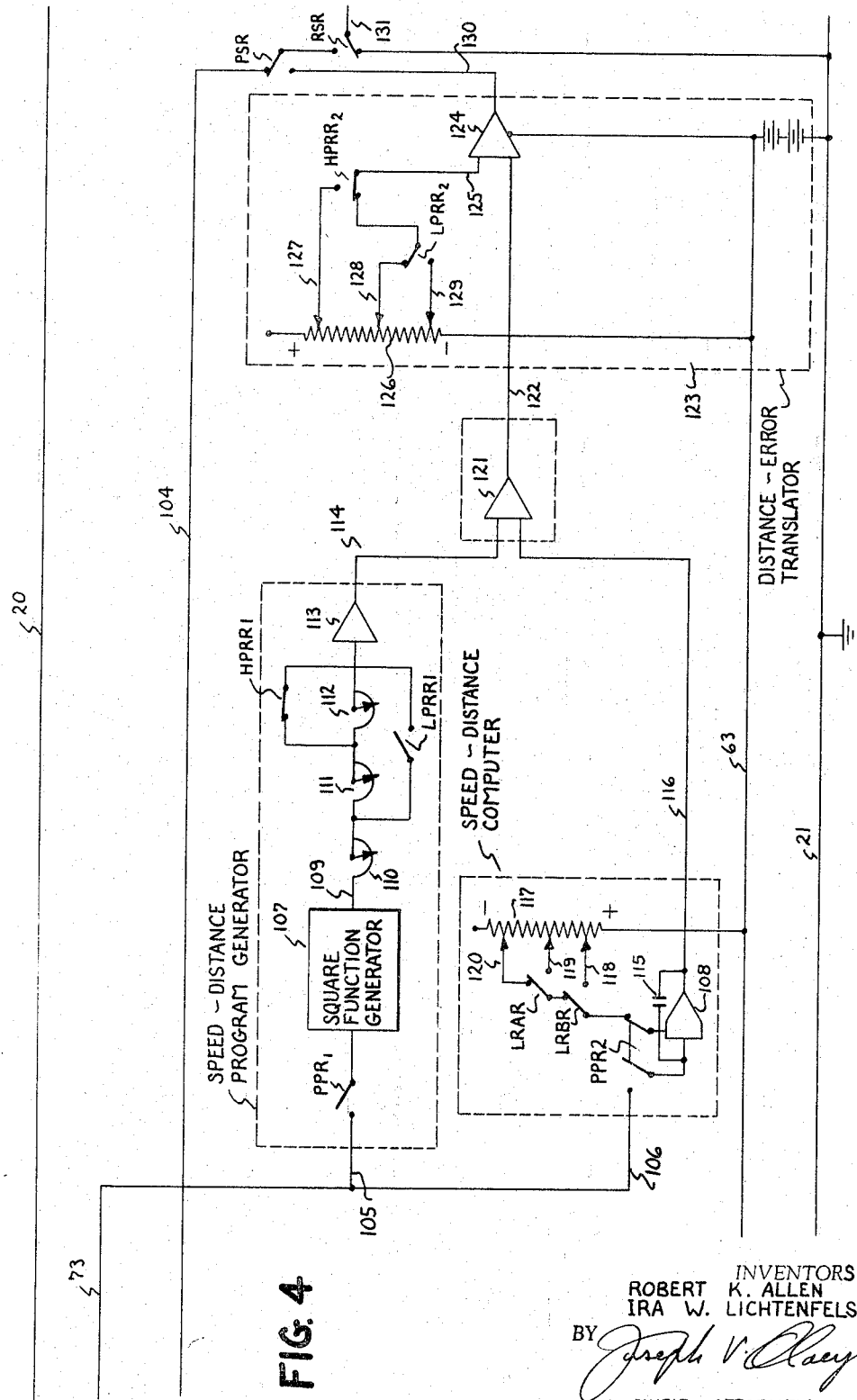
FIG. 4 is a diagram of the positioned stop system including the positioned stop open loop signal generating means and the speed-distance error signal translating means.

Referring now to FIG. 4, there is shown the speed distance control which functions to bring the train to a stop at a desired location in response to the positioned stop tone. Before describing the arrangement and operation of the positioned stop system, reference should be made to relationship between train velocity, deceleration rate and the distance in the programmed stop mode of operation. The general relationship is given by the expression $$a_{(instantaneous)} = v\frac{dv}{ds}$$

For a constant deceleration rate from some point of reference at which deceleration is initiated and for a given target stopping distance $s_0$, therefore $$v^2 = 2a(s_0 - s)$$

where
$v$ is train velocity
$a$ is the constant deceleration rate and
$s$ is the distance travelled from the point of initiating train deceleration.

The term $(s_0 - s)$ represents, of course, the distance remaining to the stop point and this term goes to zero when the distance travelled $s$ equals the target distance $s_0$, at which point the velocity $v$ is also zero.

A program for the relationship $$v^2 = 2a(s_0 - s)$$

is shown in FIG. 5 and may be conveniently provided by means of a square function generator. The foregoing relationship, however, is very elementary and neglects all second order effects. It will be understood, therefore, that although a square function generator has been selected to simplify the description, other suitable function generators may be employed to provide a program which takes into account such factors as changing windage, friction and the like, as well as other more complex factors such as changing rail adhesion with vehicle speed. For example, a program may be employed so that a higher brake rate is provided on the final approach to the station and a reduced brake rate at the high speed end.

The foregoing relationship between train velocity, deceleration and distance is programmed as illustrated in FIG. 5 and utilized by the positioned stop system shown in FIG. 4. As shown, the speed proportional signal is brought into this system over lead 73 and connected through two parallel paths by leads 105 and 106. Lead 105 connects to a square function generator 107 and lead 106 connects to an integrating amplifier 108. The square function generator 107 produces a signal at its output 109 which is proportional to the square of train velocity as measured by the tachometer system and represented by the speed signal on lead 73. Thus, based on the reference equation $v^2 = 2a(s_0-s)$, the $v^2$ signal at 109 is directly proportional to the programmed distance remaining to the stop point for any given velocity $v$. This signal may be suitably adjusted to accommodate various programmed deceleration rates by means of adjustable resistors 110, 111 and 112 and switched to the high performance and low performance modes by contacts $LPRR_1$ and $HPRR_1$ actuated respectively by the low performance request relay and the high performance request relay described above in connection with FIG. 2. The $v^2$ signal is then fed into an amplifier 113, the output 114 of which is the programmed distance remaining to the stop point as a function of train velocity.

As indicated above, the speed proportional signal on lead 73 is also connected over lead 106 into an integrating amplifier 108, the integrating function of which is provided by means of a feedback capacitor 115. The amplifier 108 is of the high-gain type commonly referred to as an operational amplifier and the feedback through the capacitor 115 is negative because of the sign reversal between the input and output of the amplifier. Starting from given initial conditions, including a preselected initial charge on the capacitor 115, the output signal 116 of the integrating amplifier is then equal to the initial charge on the capacitor minus the time integral of the input signal at 106. The time integral of the velocity signal at 106 is, of course, the distance travelled and the charge on the capacitor 115 is then representative of a preselected target distance.

Thus, for an input signal at 106 of $v$, (train velocity), the output $s_r$ at output terminal 116 of integrating amplifier 108 may be written as $s_r = s_0 - \int v dt$, where $s_0$ is the initial charge on the capacitor 115. Therefore, for a preselected initial charge on capacitor 115 representing a target distance $s_0$ to the stop point, the output $s_r$ of amplifier 108 represents the computed distance remaining to the stop point, obtained by subtracting the distance travelled, ($\int v dt$), from the target distance $s_0$ to get the distance remaining $s_r$. The foregoing explanation is slightly simplified in that the overall multiplying factor represented by the gain of the integrating amplifier is neglected for purposes of explanation, but it will be understood that this may be adjusted to provide any suitable signal level at 116 in light of the magnitude which is chosen for the target distance signal at 114.

The initial charge on capacitor 115 is set by utilizing a voltage reference in the form of a resistor 117 which is connected between logic circuit ground 63 and the negative side of the power supply. Since the logic circuit ground 63 is positive with respect to the system ground 21, the polarity of the voltage across resistor 117 is as indicated. Suitable voltage taps 118, 119 and 120 are provided for selecting different voltage levels for the capacitor 115.

The taps 119 and 118 are connected to capacitor 115 by operation of the location reference A relay and the location reference B relay to actuate contacts LRAR and LRBR, respectively. With LRAR and LRBR in the unactuated position as illustrated, the tap 120 is connected to capacitor 115 to establish an initial reference voltage representing the programmed stop distance $s_0$.

Upon receipt of a positioned stop tone by the selector 17 (FIG. 1), contacts $PPR_1$ and $PPR_2$ of the circuit of FIG. 4 are actuated. Thus, $PPR_1$ closes to connect the speed signal at 105 to the square function generator 107 and contacts $PPR_2$ move to the lefthand position to connect the speed signal at 106 to the integrating amplifier 108 and to disconnect the voltage reference terminal 120 from the capacitor 115, leaving however the initial charge on the capacitor 115 to begin the positioned stop program.

As indicated above, the signal 114 represents the target distance remaining to the stop point as a function of train velocity based on the equation $v^2 = 2a(s_0-s)$ for a constant deceleration rate $a$. The signal at 114 is thus a reference distance which specifies the reference distance remaining to the stop point as a function of train velocity. The signal at 116 is, as indicated, a computation of actual distance remaining to the stop point obtained by subtracting the distance travelled from the initial target distance $s_0$ represented by the initial charge on the capacitor 115.

The programmed or reference distance remaining to the stop point, as represented by the signal at 114, is subtracted from the computed actual distance to the stop point, as represented by the signal over 116 to amplifier 121, to generate a distance error signal at the output 122 of the amplifier. To take an example, assume that the train is on its positioned stop program and that its velocity has been reduced to say ten miles per hour, at which point the target distance signal at 114 specifies that the distance to the programmed stop point for that particular speed should be 50 feet. Assume further that the actual distance to the stop point as computed by the integrating amplifier 108 and represented by the signal at 116 is 40 feet. This means that at this particular point, the train has less actual distance in which to stop than that which would be provided by following the reference or programmed deceleration rate and, accordingly, additional braking should be applied to bring the train back on its programmed stop profile. Since the signal at 114 is larger than the signal at 116, a negative error signal is generated at the input to amplifier 121, which is in a direction calling for increased braking effort, as will be explained later on. A positive distance error signal represents on the other hand a condition in which the train has an actual distance to the stop point which is greater than the programmed distance and an error signal in this direction calls for a decrease in braking effort to bring the train back on its programmed stopping profile.

The purpose of the additional voltage references provided by actuation of the contacts LRAR and LRBR is to permit resetting of the stop program at preselected wayside reference check points. Thus, at some preselected distance down the line from the point of initiation of the positioned stop program, say at a point identified as location reference A, the location reference A relay is actuated by selector 28 (FIG. 1) to actuate contacts LRAR of FIG. 4 and connect capacitor 115 to the voltage reference tap 119. At the same time, the positioned stop programmed relay PPR is momentarily de-energized by the wayside equipment to open $PPR_1$ and move $PPR_2$ to the right-hand position to complete the connection of the voltage reference tap 119 to capacitor 115. The voltage level of capacitor 115 is thus reset to the voltage specified by the tap 119 and corresponding to the programmed stop distance from the wayside reference A location. If at that point the train is exactly on its programmed stop profile and no errors have accumulated in the tachometer, integrating or computational circuitry, the charge on the capacitor will already be at the level of the tap 119 and no reset will occur. However, if the train is not on program, for one reason or another, such as due to a sudden grade change, for example, the error will be erased by the resetting of the capacitor 115 to the proper voltage level representing the programmed stop distance from the reference A location.

Upon passing the wayside reference A location, contacts $PPR_1$ and $PPR_2$ are only momentarily deactuated for a time period sufficient to permit resetting of capacitor 115 and are then reactuated to close $PPR_1$ and move $PPR_2$ back to the lefthand position. Operation of the positioned stop program is then re-initiated in the manner described above with the reference voltage on capacitor 115 having been reset to erase any errors.

Resetting of the reference voltage on capacitor 115 may be provided for at any desired number of wayside reference locations. Thus, a second reset arrangement which is operated by the location reference B relay to actuate contacts LRBR and connect capacitor 115 to the reference tap 118 has been illustrated. Contacts $PPR_1$ and $PPR_2$ are again momentarily deactuated to permit resetting of the voltage on capacitor 115, after which these contacts are again reactuated to continue the program.

For simplicity, the detailed circuitry usually employed in implementing the foregoing described resetting of integrating amplifier 108 has been omitted and the arrangement is shown in an accepted simplified schematic form. All such circuit details, however, are well known to those skilled in the art.

*Distance-error signal and translating circuitry—(FIG. 4)*

The positioned stop distance error signal at 122 is fed into a distance error translator 123 which provides for the application of various preselected open loop brake rates. The distance error translator comprises a summing amplifier 124 which is connected to receive the distance error signal 122 as one input with a second input 125 being connected to the open loop brake rate signal generator. The open loop brake rate signal generator comprises a voltage reference in the form of a resistor 126 connected between the logic circuit ground 63 and a positive voltage source as illustrated and having taps 127, 128 and 129 for picking off various voltage signal levels. The gain of the distance-error signal is chosen to produce required train performance while maintaining a desired level of passenger comfort. This may be conveniently provided by adjusting the level of the error signal at lead 122 such as by means of a potentiometer, for example.

With the low performance and high performance request relays both in the de-energized condition, contacts $LPRR_2$ and $HPRR_2$ are in the position shown with tap 128 being connected to the input 125 of the amplifier 124. This connection applies an open loop braking signal to amplifier 124 calling for a preselected level of braking effort even in the absence of a distance error signal at input 122. The open loop brake rates are selected to provide the braking effort necessary under nominal conditions to bring the train to a stop in the programmed stopping distance at the preselected deceleration rate without any corrective action on the part of the distance error system. Variations from nominal conditions are then corrected for by the distance error system by means of the distance error signal generated at input 122.

Under high performance operating conditions with the high performance request relay energized, contacts $HPRR_2$ are actuated to connect tap 127 to the input 125 of amplifier 124, thus scheduling a higher open loop brake rate as required by high performance operating conditions. Under low performance conditions, the low performance request relay is energized to operate contacts $LPRR_2$ and connect in tap 129 to schedule a correspondingly lower open loop brake rate. It will be observed that contacts $HPRR_2$ and $LPRR_2$ are connected in priority fashion such that the high performance request condition takes priority over the low performance request condition, in the event that both contacts $HPRR_2$ and $LPRR_2$ are actuated at the same time.

It will be recalled that a net negative input to amplifier 121 is in the direction calling for increased braking effort. Because of the sign reversal produced by amplifier 121, a net positive signal at 122 is in the direction calling for increased braking effort. Thus, the positive signal input at 125 to amplifier 124 is also in the direction calling for additional braking effort. A second sign reversal is produced by amplifier 124 and a negative signal at the output 130 of amplifier 124 is thus in the direction calling for increased braking effort. The polarities just discussed are, of course, with respect to the logic circuit ground 63 and are all still positive with respect to the system ground 21. Thus, a zero signal output at 130 with respect to system ground 21 calls for maximum braking effort.

The output of the positioned stop system is connected through contacts PSR of the positioned stop relay and contacts RSR of the remove stop relay to line 131 which is in turn connected to the propulsion and braking control system. It will be observed that the remove stop relay must be energized before a signal can be applied to the braking and running control line 131. If the remove stop relay is de-energized for any reason, line 131 is connected to system ground potential. This schedules a zero output signal with respect to system ground which calls for maximum braking effort to stop the train.

With the positioned stop relay in the de-energized condition, the braking and running control line 131 is connected through contacts PSR to line 104, which is the output of the speed control system shown in FIG. 3. Under these conditions the train is controlled by the speed control signal at line 104. Upon actuation of the positioned stop relay, however, contact PSR is actuated to connect the output at line 130 from the positioned stop system to the braking and running control line 131 so that operation of the train is then controlled by the positioned stop system. It should be noted here that the positioned stop program relay PPR may be energized to actuate contacts $PPR_1$ and $PPR_2$ to commence operation of the positioned stop program from a computational standpoint without actuating the positioned stop relay. Under these conditions, the train may be controlled in response to other parameters while still allowing the positioned stop program to run. The purpose of this provision will be later on explained in detail.

*Manual hostling circuitry—(FIG. 6)*

Referring now to FIG. 6, the control line 131 is connected through contacts $AER_2$ of the automatic operation emergency relay and a manual hostling switch MHS to the line 132 which is in turn connected to the appropriate braking and propulsion controls. For automatic operation the relay AER is normally energized with the contacts $AER_2$ being thus actuated to connect line 131 to line 132 through the manual hostling switch MHS which is in the position illustrated for automatic operation. Switch MHS may be actuated to connect line 132 to the manual hostling controller 133 thereby changing the train from automatic to manual operation.

The manual hostling controller 133 comprises a voltage reference in the form of a resistor 134 and a breakdown diode 135 connected in series between the power supply line 20 and the system ground 21. This establishes a preselected voltage level across the diode 135. Connected across diode 135 is a potentiometer 136 which permits manual adjustment of the hostling output signal at 137.

*Braking and propulsion controls—(FIGS. 6 and 7)*

Presently there are two basic propulsion and braking control arrangements employed on rail rapid transit vehicles. These may be conveniently identified as the "continuous" and "discrete level" types. Today any given vehicle may have either control arrangement and it is very common to employ both types of control on the same vehicle. The system of this invention, therefore, is capable of accommodating either type control as well as a combination of such controls. The arrangement providing for continuous control is shown in FIG. 6 and the arrangement for discrete control is shown in FIG. 7.

In order to accommodate a continuous type control the amplifier 138 is provided as shown in FIG. 6. The output line 139 of amplifier 138 is connected to an appropriate continuous type control 140 to directly control the propulsion and braking systems of the vehicle in response to the signal at line 139. Braking and propulsion control 140 is of the continuous type and is arranged so that maximum braking effort is provided with a zero input signal with respect to system ground 21 on line 139, and full propulsive effort is scheduled for a maximum positive signal. It is to be noted that the signal on line 139 is applied with respect to system ground line 21.

Amplifier 138 may, of course, be of any suitable type and a two-stage transistor type with emitter circuit feedback has been illustrated in FIG. 6. Input to the first stage is through line 141 and a resistor 142 connected between the base and the emitter of the first stage transistor 143. The collector to emitter circuit of transisor 143 is connected to the power supply line 20 and the system ground 21 through resistors 144, 145 and 146.

The output of the first stage is connected to the base of the second stage transistor 147. The emitter to collector circuit of the second stage transistor 147 is connected between the power supply line 20 and system ground 21 through resistors 148 and 146. Degenerative feedback to the first stage is provided through the emitter circuit resistor 146.

Thus, the train control signal at line 139 is applied to the propulsion and braking control 140 which responds in the manner described hereinbefore. It will be noted that while all computations are performed with respect to logic circuit ground 63, the final control signal at line 139 is applied with respect to the system ground 21 as previously indicated.

In order to accommodate a discrete level type control the train running and stopping control signal at line 132 may be applied to a discrete type propulsion and braking control in place of, or in combination with, the continuous type control 140 illustrated in FIG. 6.

To this end, the train running and stopping control signal line 132 is shown in FIG. 7 connected to a number of discrete level braking and propulsion selector circuits 150, 151, 152 and 153, each of which is in turn connected to actuate a particular propulsion or braking condition. The selector circuits 150 through 153 are arranged to energize respectively train line relays 154, 155, 156 and 157, each of which controls a particular propulsion or braking mode of operation. It will be appreciated, of course, that there may be any number of selector circuits depending on the number of operating modes which are desired.

A suitable circuit for use in the selectors 150–153 is shown in detail for selector 150. In this circuit two transistors 158 and 159 are held in the "on" condition to hold transistor 160 in the "off" condition as long as the input signal at line 132 remains above a preselected level. This preselected level is established by a breakdown diode 161, biased to its linear region by a suitable resistance 162, so as to present a substantially constant voltage reference. In this condition the circuit through transistor 160, resistor 163 and diodes 164, forming a shunt path around relay 154, is open and relay 154 is thus in the energized condition. When the path around the relay coil 154 is closed by switching transistor 160 to the "on" condition, the relay 154 is de-energized.

The control signal input at line 132 is connected to the base of transistor 158 through a diode 165 and a resistor 166. When the applied voltage on line 132, less the voltage drops of resistor 166 and the emitter-base junction of transistor 158, exceeds the breakdown voltage of breakdown diode 161 then transistor 158 is forward biased and rendered conductive. When the applied voltage on line 132 drops below this level, however, transistor 158 is reverse biased by operation of the breakdown diode device 161 which is then in its blocking state. Diode 167 is provided to limit the back voltage on the emitter base junction of transistor 158 to a desired low value. The emitter to collector circuit of transistor 158 is connected to the power supply line 20 and system ground line 21 through the breakdown diode 161 and resistors 168 and 169 which in turn are connected to the base of transistor 159.

The collector-emitter circuit of transistor 159 is connected to power supply line 20 and system ground line 21 through the resistors 163 and 170. When transistor 159 is conductive, transistor 160 is reverse biased by the voltage drop on diodes 164. On the other hand when transistor 159 is nonconducting a conventional base current circuit is established for transistor 160 through resistor 170. Resistors 163 and 168 are provided to assure a snap switching action for transistor 159 rather than allowing class A operation thereof. A bleed path is established for diodes 164 by the resistor 171. The resistance of the parallel path around train line relay 154, formed by the resistance 163, diodes 164 and transistor 160, is sufficiently low when transistor 160 is conducting to cause relay 154 to drop out. A commutating diode 172 and a capacitor 173 are connected across the coil of relay 154 to absorb switching transients.

Although the detailed circuitry of only one of the selectors, 150–153, has been described it will be understood that the selector circuits may be all similar with only the breakdown diode devices 161 being chosen to have different breakdown voltage levels in each of the other selectors. For example, the breakdown diode device in selector 151 is chosen so that a higher signal level on line 132 is required to cause breakdown than was required to cause breakdown of the diode device in selector 150. Similarly, the breakdown diode device in selector 152 is chosen so that a higher signal level on line 132 is required to cause breakdown than was required to cause breakdown of the device in selector 151 and so on. Thus, the selector circuits 150–153 are arranged to be operative to energize their respective train line relays 154–157 in a discrete step relationship relative to each other.

For example, for a zero signal level at line 132 all relays 154–157 are de-energized. At a first signal level on line 132 selector 150 operates to cause train line relay 154 to be energized. At a second discrete signal level on line 132 selector 151 operates to cause relay 155 to be energized and so on until at the maximum signal level on line 132 all of the selectors 150–153 have been operated to cause all train line relays 154–157 to be energized to connect in the various train lines and schedule full propulsive effort.

Viewed in another way, as the control signal level on line 132 is reduced, the selector circuits 150–153 operate to sequentially drop out train line relays 154–157 to reduce the propulsive effort in discrete blocks. As described hereinbefore the signal level at which the different relays drop out may be conveniently established by a suitable selection of the breakdown diode devices 161 in each of the selector circuits 150–153.

Accordingly, as the control signal on line 132 continues to be reduced the propulsion selectors are all operated so as to de-energize their respective train line relays and the braking selectors begin to operate to de-energize their train line relays to schedule discrete blocks of braking effort. The selector control circuits 150–153 are selected such that as the signal level on line 132 approaches the zero level with respect to system ground line 21, all of the train line relays are de-energized and maximum braking effort is scheduled. The arrangement, therefore, is such that all of the selectors 150–153 must be operated to hold their associated train line relays in the energized position in order to schedule full propulsive effort. If, for any reason, the train line relays are de-energized, due to a power failure or other malfunction, full braking effort is scheduled thereby providing fail safe operation.

Each train line control relay 154–157 may have a contact interlocked in series with the coil of the next higher level train line relay. This provides an additional priority ladder so that drop out of the lowest set train line relay positively insures that none of the other relays can be energized.

The train line arrangement to schedule different degrees of propulsion and braking effort is widely employed in present day equipment. Systems of this type are shown, for example, in United States Patents No. 2,566,898 and No. 3,034,031 which show braking and propulsion control arrangements currently in use on many rapid transit rail vehicles. As shown in those patents the systems employ a combination of discrete level and continuous type controls. The discrete level control is employed for the various degrees of propulsion effort and also to set up the dynamic braking system. A continuous type control, the air brake controller, is then employed to control the remainder of the dynamic braking and the entire air brake system. Thus, the systems provide three discrete steps of train line control for three degrees of propulsion power, SWITCH, SERIES and PARALLEL, and one step of discrete train line control to bring on minimum service brakes. The remainder of the braking effort is modulated by means of the conventional self-lapping air brake controller. This would be provided by means of an additional train line which, however, would be in the form of an air pipe.

To more clearly illustrate how the system of the present invention may be adapted to match up with train lines so as to provide automated control of present day type propulsion and braking equipment if desired, reference may be had to FIG. 8. In FIG. 8 there is shown a system having a propulsion and braking control system of the type employed, for example, in U. S. Patent No. 2,566,898. As shown in that patent, the train lines 101–108 interconnect the cars of a rapid transit train and are selectively energized from a single master controller to provide the desired propulsion or braking to either accelerate or stop under the manual control of an operator. As shown therein, the train lines 101–108 are associated with the master controller 26–27. Accordingly, in FIG. 8 the electrical train lines are conveniently identified as 201–208 with the air pipe train line identified as 209 and are controlled in response to the signal on the line 132.

Referring now to FIG. 8, there is shown the amplifier 138, a continuous type brake selector 140 and the four discrete type selectors 150–153. The control signal on line 132 is applied to amplifier 138 and to the discrete selectors 150–153.

Brake selector 140 may be, for example, an electro-pneumatic transducer associated with the air brake system and arranged to require a certain level of input signal from amplifier 138 to hold the air brakes at zero pressure, or COAST position. The control signal on lines 132 is, therefore, applied to amplifier 138 where it is amplified sufficiently to provide a direct input signal on line 139 to control 140. Braking is then controlled by continually modulating the pressure in the air brake train line 209 from zero to full service brake pressure in response to the amplified control signal on line 139. In the event of a zero control signal on line 132, or loss of power in the amplifier 138, the air brakes move to full service position to provide for fail safe operation.

The control signal on line 132 is also applied to the discrete level type selectors 150–153. As described in detail, hereinbefore, these selectors are voltage-magnitude responsive, each having a different discrete operating voltage at which its associated train line relay 154–157 is energized.

The operation of the arrangement of FIG. 8 may best be explained in conjunction with FIG. 9 which shows the relationship between the various signals and the braking and running control response. Thus, in FIG. 9 there is illustrated the response of the propulsion and braking control system in relationship to the speed control signal which is generated at line 104 (FIG. 3) and the positioned stop control signal which is generated at line 130 (FIG. 4) and which signals ultimately appear on the line 132. These relationships are represented in the form of vertical lines with the zero signal level, corresponding to system ground line 21, being at the bottom of the chart and the full positive signal being at the top of the chart.

It will be observed that the response of the propulsion and braking control system is divided into a PROPULSION MODE and a BRAKING MODE witth the intermediate between these two modes being the COAST condition. The translation of the logic circuit ground above system ground brings the logic circuit ground potential level to approximately that of the COAST condition of the braking and propulsion control. In other words, for a zero signal output of either the positioned stop control or the speed control with respect to logic circuit ground, the net signal thus being at the level of logic circuit ground, the COAST condition is scheduled by the propulsion and braking control.

The open loop braking and speed signals are then imposed about the logic circuit ground potential. A typical condition of the speed control signal relationship in which an open loop speed signal is imposed with respect to logic circuit ground to provide a net signal $E_1$ calling for a preselected level of propulsion $P_1$ has been illustrated. The voltage $E_1$ is thus the zero speed error signal level for the particular running condition illustrated and $P_1$ is the level of propulsive effort schedule by the open loop speed signal which, as heretofore explained, is selected to maintain the reference running speed under nominal conditions.

For speed levels below the reference speed, the speed error signal adds to $E_1$ to increase propulsive effort. Similarly, for speed levels in excess of reference speed, the speed error subtracts from $E_1$ to reduce propulsive effort. It will be noted that the zero speed error signal $E_1$ has been translated in two respects in relation to system ground. The first translation occurs by reason of the elevation of the logic circuit ground potential above the system ground and the second by reason of the further imposition of the open loop speed signal.

The relationship of the positioned stop control signal is similar in that the logic circuit ground potential is at the level of the COAST condition of the propulsion and braking control. Superimposed on this translation is an open loop braking signal which for the particular braking condition specified schedules an open loop braking effort of $B_2$ in the propulsion and braking control.

For the particular condition illustrated, voltage $E_2$ thus represents the zero error signal level for the positioned stop control system and computed speed distance errors are superimposed about that level. For a computed actual distance to the stop point less than the programmed remaining distance, the distance error signal subtracts from voltage $E_2$ to schedule additional braking effort; for a computed actual distance to stop of greater than the programmed remaining distance, the distance error adds to voltage $E_2$ to reduce braking effort. A zero output signal with respect to system ground, therefore, schedules maximum braking effort.

In the arrangement shown in FIG. 8, therefore, a zero control signal on the line 132 results in all the selectors 150, 151, 152 and 153 being de-energized. Also, due to the normally closed contacts of relay 154 associated with selector 150, BRAKE train line 205 is energized. Further, due to the normally closed contacts of relay 155 associated with selector 151, COAST train line 203 is also energized. At the same time, since the input to continuous type brake selector 140 is also zero, full air brake is being applied.

With a control signal sufficient to actuate selector 150 the brake line 205 is de-energized leaving COAST train line 203 energized. Also, the control signal level on line 132 sufficient to actuate selector 150 provides for an input at line 139 to continuous type brake selector 140 sufficient to set that selector in the COAST position also.

Since the system is automated, a received signal would, of course, determine whether the propulsion reverser actuator 176 positions the armature 216 to the forward or reverse position. Assume, initially, that actuator 176 has positioned armature 216 for forward operation. Under that condition the next higher level control signal actuates selector 151 which energizes FORWARD train line 201 and the SWITCH, or first power, train line 206. It will be apparent that if actuator 176 had called for reverse operation actuation of selector 151 would have energized REVERSE train line 202 and SWITCH train line 206. For the remainder of the description, however, assume as before that armature 216 is positioned for forward operation.

The next higher control signal level, then, actuates selector 152 which, through relay 156 energizes SERIES, or second power, train line 204; FORWARD train line 201 as well as SWITCH train line 206 being also still energized due to the interlock arrangement.

Finally, the highest level control signal on line 132 actuates selector 153 which through relay 157 energizes PARALLEL, or full power, train line 207. Again, due to the itnerlock arrangement FORWARD train line 201, SWITCH train line 206, and SERIES, or second power, train line 204 remain energized.

It will be understood that the foregoing description is for purposes of explanation only and is not to be taken in a limiting sense. For example, the system of the present invention is equally adaptable to propulsion control systems for either A-C or D-C as well as with systems which employ only discrete-type braking and propulsion control or only continuous type control rather than a combination of such controls. For example, some present day rapid transit vehicles employ six separate train lines which establish three discrete levels of propulsion and three discrete levels of braking. Usually in such vehicles no air brake system would be employed but instead electric friction brakes would be provided which are readily controlled by discrete type train line control.

Further, a control system adapted for providing continuous propulsion control, such as would be provided by the control 140 in response to the input signal thereto on line 139 in FIG. 6, is disclosed and claimed in patent application Ser. No. 330,319, filed Dec. 13, 1963 and assigned to the same assignee as this invention. In that system, for example, the signal on line 139 would be connected to control the phase advance and retardation of the propulsion control system. Continuous control of the air brake system may be readily provided by employing a suitable electro-pneumatic transducer to provide for control of the brake system lapping unit in response to the control signal on line 132 which would of course be suitably amplified such as by the amplifier 138. Alternatively, electric brakes may be employed and controlled either continuously or by discrete level control apparatus.

From the foregoing discussion it will be apparent that in order to provide the most desirable operating characteristics the propulsion and braking selectors should be selected so as to be compatible and match with the propulsion and braking controls utilized on a given vehicle. Such selection provides for the achievement of the desired high performance, smoothness of operation and low maintenance.

*Station program actuators—(FIG. 10)*

In connection with the station program receiver portion of the system shown in FIG. 2, there has been shown and described the circuits for receiving and selecting the station program command signals. Thus, each station platform area may be provided with a local loop antenna which is employed to transmit the station program commands to a vehicle standing at the station platform. That is, when the train is standing at the platform the signals transmitted by means of the local loop antenna are picked up by pick-up 13 and applied to the receiver 33 (FIG. 2) to provide one or more of the functions such as OPEN LEFT DOORS, OPEN RIGHT DOORS, REVERSE DIRECTION and OBSERVE HIGH OR LOW PERFORMANCE. These station program commands, therefore, can only be received by a train standing in the station platform area at which time it is under the influence of the station loop antenna. The details of the selection of these functions from the received command signals has already been described and, therefore, need not be repeated here.

Figure 10:
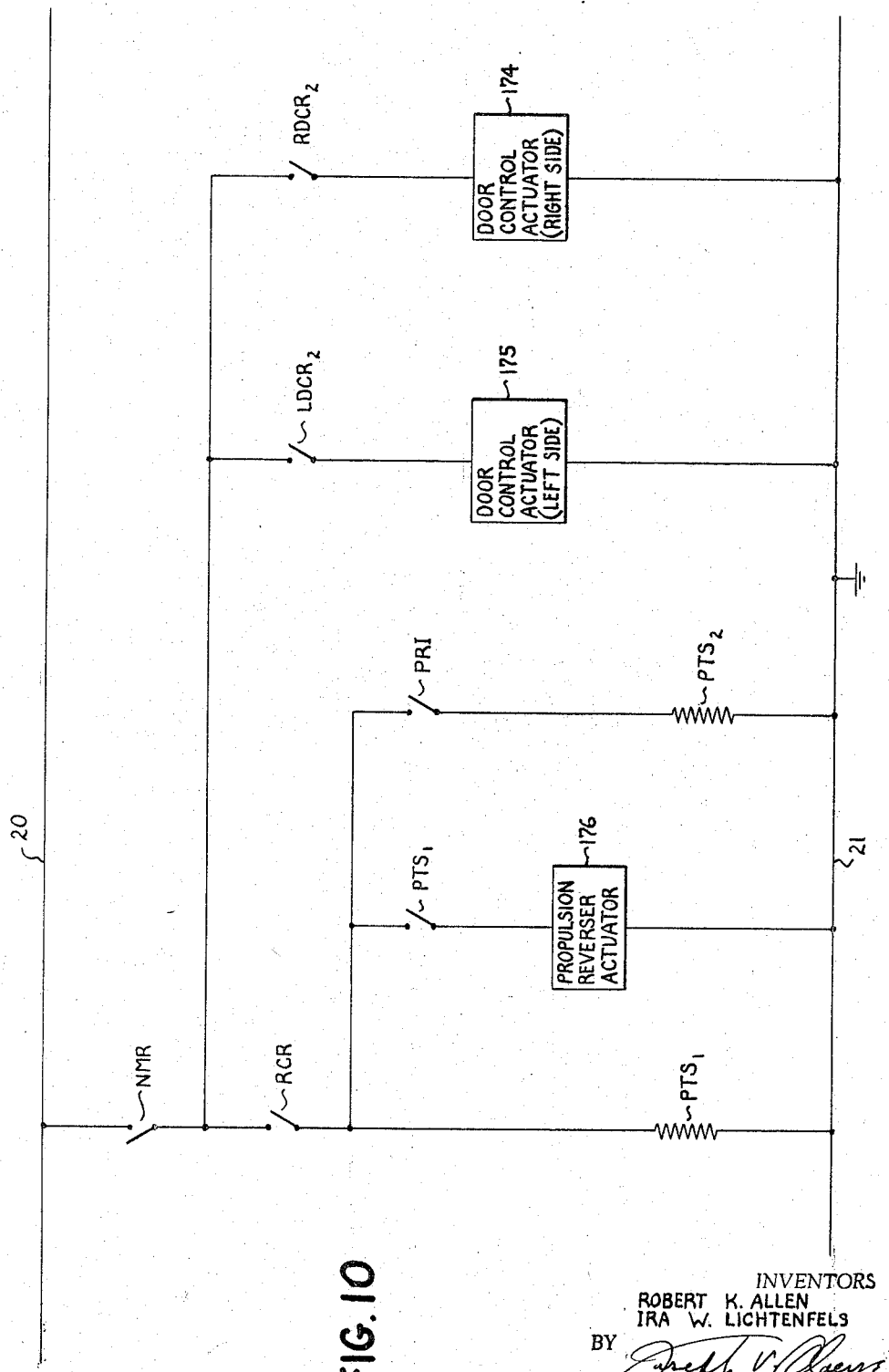
FIG. 10 illustrates the circuitry for actuating the station and terminal controlled functions such as door opening and closing and propulsion system reversing.

The station program actuator portion of the system is shown in FIG. 10. For purposes of illustration, only three functions have been shown, namely, actuation of the right side doors by energization of actuator 174, actuation of the left side doors by energization of the actuator 175 and actuation of the propulsion reverser control by energization of the actuator 176.

The station program actuators 174, 175 and 176 are connected to the power supply line 20 through contacts NMR of the no-motion relay so that none of them can be operated until the no-motion detector has indicated that the train has come to a stop, at which time NMR contacts close.

The doors of the vehicle are normally biased to their closed position and are operated when the actuator associated therewith is energized. Such door opening mechanisms are well known in the art and since the details thereof form no part of the present invention such details are not given herein. Usually the connection to the station program actuators 174, 175 and 176 is "train-lined" through the train to the local actuator in each car in a well-known manner.

The remaining station program function to be provided is the reversing of the train. Actuation of the propulsion reverser requires closing of the no-motion relay contact NMR, to indicate that the train has come to a stop, and also some additional sequential priority. In FIG. 10 there is shown a simplified priority arrangement wherein first and second pickup transfer switches $PTS_1$ and $PTS_2$ are provided. These contacts are suitably interlocked so that the running command pickups are disconnected as a first step with appropriate interlocking before power reversal can occur. Also the pickup transfer switches are suitably interlocked to provide for reconnection of the running command pickups so that commands can be received for operation in the opposite direction.

To this end, control power is applied through the no-motion relay contacts NMR and the reverser control relay contacts RCR to cause the coil of the first pickup transfer switch $PTS_1$ to be energized causing contacts $PTS_1$ thereof to close and allow propulsion reverser actuator 176 to be operated. Energization of the coil of $PTS_1$ also opens a pair of contacts (not shown) which operate to disconnect running command pickups 10 and 11. Also, operation of the propulsion reverser actuator causes propulsion reverser interlock contacts PRI to close thereby energizing the coil of the second pickup transfer switch $PTS_2$ whose contacts (not shown) are operative to reconnect the running command pickups 10 and 11 so that running commands can once again be received and operation provided in the opposite direction.

Having described the overall arrangement of the system of the present invention, the operation thereof in response to reception of the various command signals shown in FIG. 1 will now be described in detail.

*Approach speed operation*

Referring now to FIG. 1, assume that all systems are functioning normally so that the contacts associated with these systems are closed. Assume further, that the automatic operation master switch AOS has been closed and that the APPROACH speed command signal is received by the running command receiver through pickups 10 and 11. Selection of the APPROACH speed command signal by selector 18 causes contact $18_a$ to close and contact $18_b$ to move to the left. Closure of contact $18_a$ causes running command presence relay RCPR to be energized closing contacts RCPR in the emergency circuit. Movement of contact $18_b$ to the left causes APPROACH speed relay ASR to be energized. Due to the interlock arrangement between contacts $18_b$, $17_b$, $16_b$ and $15_b$, remove stop relay RSR is also energized and the system is in operation.

As shown in FIG. 3, energization of remove stop relay RSR causes contacts $RSR_1$ and $RSR_2$ in the speed-command reference and speed-error translator circuits, respectively, to close. Also, energization of the APPROACH speed relay actuates similarly located contacts $ASR_1$ and $ASR_2$ to the left-hand position, thereby connecting voltage reference 94 to the input 93 of the speed error comparator 90 and connecting open loop speed reference 101 to the input 99 of amplifier 98 of the speed error translator 97. Both of these connections are made through remove stop relay contacts $RSR_1$ and $RSR_2$.

Thus, energization of the approach speed relay ASR to actuate contacts $ASR_1$ and $ASR_2$ connects in a speed reference signal to the speed error comparator 90 and an open loop speed signal to the speed error translator 97. Actual train running speed is measured by means of the tachometer circuit of FIG. 2 with the signal at line 73 being proportional to train velocity. Actual train speed is compared with the reference train speed by subtraction of the input to amplifier 91 and a speed error signal is obtained at output 96 of amplifier 91 as has been explained above.

The speed error signal is then translated by an open loop speed signal of preselected magnitude as established by the voltage reference 101. As indicated above, the open loop speed signal is of a magnitude as established by the voltage reference 101. Also, the open loop speed signal is of a magnitude selected on the basis of the propulsive effort required to maintain the reference speed under nominal conditions, that is, with respect to loading, track conditions, and the like. Thus, for the particular operating condition under discussion, that is, operation under the APPROACH speed command, the open loop speed signal, represented by voltage reference 101 connected to input 99 of amplifier 98, is of a magnitude such as to maintain the train at the APPROACH speed under nominal conditions. In this case, no specific number has been assigned to the APPROACH speed but for purposes of illustration, let us assume that it is 20 miles per hour. Thus, under nominal conditions the open loop speed signal at input 99 to amplifier 98 would be sufficient to maintain the train at 20 miles per hour on level, tangent track.

Continuing on with the example under discussion, it will be observed that the remove stop relay RSR is energized and that the positioned stop relay PSR is not energized. Referring to FIG. 4, this means that contacts PSR are in the position shown and that contacts RSR have been actuated to their upper position to connect line 131 to line 104 through contacts PSR. Thus, the system is connected to operate under the speed control mode with the positioned stop system being by-passed by contacts PSR.

Moving on to FIG. 6, it is noted that the automatic operation emergency relay AER is engaged by reason of the continuity established through the emergency circuit of FIG. 1 and that the contacts $AER_2$ are therefore moved to their upper position to connect line 131 to line 132 with the manual hostling switch MHS being in the position shown. Thus, the speed control system is connected to the propulsion and braking control system of the train either in the manner as illustrated in FIG. 6 through amplifier 138 and continuous type controls 140 or as illustrated in FIG. 7 through the discrete type control as represented by the voltage magnitude responsive, sequentially operable selectors 150 through 153.

For the condition just described, as long as the train remains at the APPROACH speed level, in this case 20 miles per hour, no error signal will be generated and the speed error output at 96 of amplifier 91 will be zero with respect to logic system ground 63. Added to the zero speed error signal, however, is the open loop speed signal of the voltage reference 101 which as mentioned above is selected to provide a propulsive effort sufficient to maintain the desired speed, in this case 20 miles per hour, under nominal conditions.

If the actual train speed should exceed the reference speed with the speed signal at line 92 (FIG. 3) thereby becoming larger than the reference speed signal at line 93, an error signal is produced at output 96 of amplifier 91, which error signal is proportional to the difference between the actual speed and the reference speed.

This error signal is superimposed as a corrective signal on the open loop speed signal, in this case in a direction to reduce the net signal at line 104 so that propulsive effort is thereby reduced to correct for the speed error in excess of reference speed. Similarly, if train speed should fall below the reference speed, an error signal of the opposite polarity is developed at 96 which adds to the open loop signal and increases the net signal at 104 to increase propulsive effort. The relative weight of the corrective action of the error signal superimposed on the open loop signal is determined by the relative gain of each signal. The gain of the error signal over the open loop signal is set in any convenient manner to satisfy the particular performance and comfort requirements for the specific application.

Thus, the speed error signal acts as a modulating corrective signal about the reference level established by the open loop speed signal. This means that an error signal of a magnitude sufficient to hold the propulsion system at the desired operating level is not required to be generated by the speed error loop. The gain requirements of the speed control loop are thereby greatly reduced. In other words, in order to generate a signal level at line 104 (FIG. 3) sufficient in magnitude to schedule the required steady state propulsive effort with a proportional system without the open loop speed signal, either a very large steady state speed error must be tolerated or a very high gain must be provided such that the required signal can be generated with a small speed error. Such a high gain system is, of course, undesirable from at least two standpoints. First, in such a high gain system the response of the system is required to be so strong that accelerations and decelerations are encountered which are unacceptable from the standpoint of passenger comfort. Second, in a closed loop control system of such type a very high gain will often cause system instability and produce sustained oscillations with the control correcting first in one direction, overshooting the mark, and then correcting again in the opposite direction in cyclic fashion.

The provision of the open loop speed signal eliminates the need for a high gain proportional system and it also eliminates the need to consider a higher order of control such as, for example, a system which might respond to the integral of the speed error signal.

Thus, with the running command receiver calling for the APPROACH speed condition, the system operates as just described to modulate the speed of the train to the preselected reference level.

*Clear speed operation*

Assume now that the running command receiver receives a CLEAR speed running command signal through pickups 10 and 11 so that selector 19 is thereby caused to operate contacts 19a and 19b. It will be observed that the CLEAR speed command cannot actuate the clear speed relay CSR if an APPROACH speed signal is being received at the same time because in such an event, contact 18b will be in the lefthand position and no actuating power will be available to contact 19b. Assume, however, that the CLEAR speed command is the only one being received and that contacts 19a and 19b are accordingly actuated to energize the running command presence relay RCPR and the clear speed relay CSR.

Referring now to FIG. 3, energization of the clear speed relay actuates contacts $CSR_1$ and $CSR_2$ to connect speed reference 95 to the speed error comparator 90 and to connect open loop speed reference 100 to the speed error translator amplifier 98. The speed command reference 95 calls for a preselected speed level, let us say 50 miles per hour, which is connected to input 93 of amplifier 91 and the open loop signal at input 99 of amplifier 98 schedules a preselected level of propulsive effort calculated to maintain the 50 miles per hour under nominal conditions. Except for the magnitudes of the speed command reference and the open loop speed reference, the operation of the system under the CLEAR speed running command is otherwise the same as that just described in connection with operation under the APPROACH speed command. It will be appreciated, of course, that any number of speed command references and corresponding open loop signals may be provided although only two examples have been given for purposes of illustration and description.

*Positioned stop operation*

For a description of the next mode of operation, assume that the running command signal received from the wayside equipment is the positioned stop signal. Receipt of this signal by selector 17 actuates contacts 17a and 17b to energize the running command presence relay RCPR and to energize the positioned stop relay PSR as well as the positioned stop program relay PPR through diode 26. The remove stop relay RSR is also energized through contacts 15b and 16b which are in the positions illustrated. Referring now to FIG. 4, it will be observed that the energization of relays PSR, PPR and RSR actuates contacts PSR, $PPR_1$, $PPR_2$ and RSR to connect output line 130 of the positioned stop system to line 131 and to connect the speed signal at line 73 through lines 105 and 106 to the square function generator 107 and the integrating amplifier 108, respectively. Actuation of $PPR_2$ to the lefthand position also disconnects capacitor 115 from tap 120 of voltage reference 117, at which point capacitor 115 has been charged to the initial reference level as represented by the tap 120. Thus, with actuation of the contacts as just described, the positioned stop program begins with the initial charge on the capacitor 115 representing the reference distance to the stop point. As stated, hereinbefore, the integrating amplifier input circuit is shown in a simplified schematic form for simplicity.

As explained above, the integrating amplifier 108 subtracts the distance travelled from the reference distance to derive a signal at line 116 which represents the computed actual distance remaining to the stop point. At the same time, the square function generator 107 produces a signal at 114 which represents the programmed distance to the stop point based on the square of the velocity of the train at any given instant. The difference between the programmed distance to the stop point and the computed actual distance to the stop point then represents the distance error which specifies at any given instant whether the train is either ahead or behind its programmed distance to the stop point. This error signal is derived at line 122 by subtracting the programmed distance signal 114 from the computed actual distance signal 116.

If the train is ahead of its programmed distance, that is, if it is closer to the stop point than it should be based on the velocity at which it is travelling at that instant, the error signal at 122 is in the direction to increase braking effort and increase the deceleration rate. Conversely, if the train is further away from the stop point than it should be for the velocity at which it is travelling, the error signal at 122 is in the direction to reduce the braking effort and decrease the deceleration rate.

The error signal at 122 is translated with respect to system ground 21 by reason of the difference in potential between logic circuit ground 63 and system ground 21 as has been explained above. This signal is then further translated by reason of the imposition of an open loop brake rate in the translator 123. In order to determine the open loop brake rate under which the train is operating, the station program command under which the train is operating must be determined. This is established by the station program pickup 13 in the manner already described. Assume for purposes of explanation, that the train is operating under a low performance command scheduled at the preceding station stop such that the low performance request relay LPRR is locked in its energized position.

Under these conditions, contacts $LPRR_1$ and $LPRR_2$, shown in FIG. 4, are both actuated with the result that voltage reference tap 129 is connected to the input 125 of amplifier 124 and adjustable resistors 111 and 112 are shunted out of the circuit of the programmed distance generator. The shunting of resistors 111 and 112 by the closure of $LPRR_1$ increases the programmed distance to stop for any given velocity level. Stated another way, for any given distance from the stop the scheduled train velocity is reduced. The connection of voltage reference tap 129 to amplifier 124 schedules a corresponding open loop brake rate which is calculated to maintain the scheduled velocity distance profile under nominal conditions.

The overall braking rate signal which represents a combination of the open loop brake rate and the distance error signal is thus derived at output 130 of amplifier 124 and this signal is in turn connected to the braking and propulsion control line 131 through positioned stop relay contacts PSR. As long as the train is on the programmed velocity-distance profile, the open loop brake rate established by the connection of the voltage reference tap 129 to amplifier 124 through low performance relay contacts $LPRR_2$ is maintained. The distance error signal at line 122 then modulates the brake rate above and below the open loop rate to maintain the train on the programmed velocity-distance profile.

It will be readily apparent from the foregoing description that entry upon the positioned stop program does not necessarily schedule braking effort. Whether braking is initiated depends upon correspondence between the distance to the target (stopping point) of the actual train position and the distance as required by the program. This distance is influenced by the velocity of the train at the time of entry on the program. Accordingly, a train entering the station stop approach area considerably below normal entry speed will not go into the braking mode until it reaches the point on the program where its velocity-distance relationship requires application of brakes. Thus, upon receipt of a positioned stop command signal where the train velocity is sufficiently below the programmed velocity-distance profile, propulsive rather than braking effort may in fact be scheduled. This mode of obtaining positioned stop allows particularly for high performance in that no time is lost with premature braking.

At one or more points along the wayside, between the point of initiation of the positioned stop and the stop point, location reference resets may be provided to reset the target distance computer and wash out any accumulated errors. The system has been illustrated as having two such reset points which, for convenience of description, have been designated as location reference A and location reference B. The location reference pickup arrangement is illustrated in FIG. 1 with the signal being received through vehicle mounted pickup coil 12.

Assume now that the train arrives at the location reference A point along the programmed stop route. Receipt of the location reference A signal by the pickup 12 actuates selector 28 to close contact 30 and energize location reference A relay LRAR. Simultaneously, the positioned stop system is momentarily deactuated to open $PPR_1$ and move $PPR_2$ to the righthand position. This is accomplished by momentarily interrupting the positioned stop command signal with the application of the location reference A signal. The actuation of contacts LRAR (FIG. 4) connects voltage reference tap 119 to capacitor 115 to reset the voltage across capacitor 115 to the reference level corresponding to the location reference A point.

The location reference A signal is applied only for a short instant as the train passes the location reference point. The charging and discharging time constant of the capacitor, therefore, should be selected to accommodate the range of voltage reset desired. As the train passes the location reference A point, the positioned stop command is again applied to close $PPR_1$ and move $PPR_2$ to the lefthand position whereby operation on the positioned stop program is again resumed with the capacitor reset to the desired voltage corresponding to the target distance from the reference A point to the stop point. Any errors which have accumulated during the period running from the initial reference setting are thus eliminated.

There may also be a number of additional reset points along the positioned stop route and, as indicated above, a second such point, designated as location reference B, has been illustrated. Location reference B is, of course, further down the track from location reference A and closer to the desired stop point. Receipt of the location reference B signal actuates selector 29 to close contacts 31 and energize the location reference B relay LRBR. Simultaneously, the positioned stop command is momentarily interrupted, as in the case of application of the location reference A signal. This sequence opens $PPR_1$, moves $PPR_2$ to the righthand position, and actuates contacts LRBR to connect voltage reference tap 118 to capacitor 115 to reset the capacitor voltage to the level corresponding to the target distance from location B to the stop point. As the train passes the location B point, the positioned stop command signal is again applied to close $PPR_1$ and move $PPR_2$ to the lefthand position, whereupon the train returns to operation on the positioned stop program as explained above with the target distance voltage now reset on capacitor 115 and with the accumulated errors having been washed out.

The train now continues operation on the positioned stop program with the velocity being reduced to zero at the stop point (FIG. 5). As the train comes to a stop, the no-motion detector (FIG. 3) de-energizes the no-motion relay NMR to close contacts NMR of FIG. 10 and thereby permit actuation of the station program functions such as door actuation and the like. Contacts NMR may also be connected to actuate locking brakes as an additional safety feature if desired. Actuation of the station of the station program functions is accomplished through application of the appropriate signals to the station program pickup 13 (FIG. 2) from a suitable loop antenna located at the station platform area. Thus, if for some reason the train has stopped outside the station platform area the station program commands will not be received by the train and the doors will not open. This provides additional safety features to assure that the doors do not open where there is no station platform. At this point also, the high performance or low performance setting is made for the next station stop. Upon closing of the doors, this signal is locked in and retained for the next station stop by the circuitry of FIG. 2 in the manner previously described.

It will be observed by reference to FIG. 4 that the positioned stop system may be operated in the high performance mode or the low performance mode upon receipt of appropriate command signals to actuate a high or low performance relay. If neither the high performance relay nor the low performance relay is actuated, however, the system operates in the normal mode. The low performance mode has just been described. Actuation of the high performance request relay opens contacts $HPRR_1$ to insert maximum resistance into the circuit and reduce the programmed distance signal at 114, thereby scheduling a smaller target distance to stop for any given velocity, or in other words, a higher approach velocity for any given distance to stop. If neither the high performance nor the low performance signals are applied, $HPRR_1$ remains closed and $LPRR_1$ remains open so that only resistor 112 is shunted. It is apparent that this schedules a velocity distance profile which is intermediate the high performance and low performance modes.

Open loop brake rates corresponding to each of these three modes are scheduled in the distance-error translator 123. Actuation of the high performance request relay actuates contacts $HPRR_2$ to connect voltage reference tap 127 to amplifier 124, thereby scheduling a higher open loop brake rate corresponding to the higher deceleration rate required for the high performance mode. If neither the high performance nor the low performance mode is scheduled, voltage reference 128 is connected to amplifier 124 to schedule an open loop brake rate intermediate the high performance and low performance rates.

It is to be noted that for additional safety reasons priority interlocking is employed in all contact sequences shown in FIG. 4. Thus, in the distance-error circuit the low performance mode is shown overriding the high performance mode to assure that, should both relays become energized at the same time due to some malfunction, the longest scheduled distance to stop will take priority. On the other hand in the distance-error translator circuit the high performance (highest open loop brake rate) mode overrides the normal and low performance modes. Also, priority interlocking is shown as between the location B, location A and initial reference contacts for setting the reference distance on capacitor 115 of the integrating amplifier so that location reference B takes first priority, location reference A next priority with last priority being assigned to the initial reference. Accordingly, the shortest distance to stop will take priority in the event that more than one location reference relay becomes energized.

The provision of the logic circuit ground translation and the open loop brake rate translation provides a number of advantages. The logic circuit ground translation provides for fail-safe operation in that a zero error signal with respect to system ground schedules maximum braking effort as has been described in connection with FIG. 9. The further translation, in the form of the open loop brake rate signal, translates the norminal operating point of the system and avoids the requirement for generating an error signal of corresponding magnitude to schedule the required nominal braking rate. This means that the open loop gain of the closed loop positioned stop control can be substantially reduced because only relatively small error signals need now be generated about the translated nominal operating point. The resulting reduction in loop gain which can be achieved greatly reduces system stability problems which would otherwise be encountered with a high gain system. Further, error gain may be set as required for the desired stop accuracy and other performance requirements for passenger comfort and system stability dictated by the capabilities of the propulsion and braking system of the particular vehicle.

As indicated above, similar advantages are obtained in the speed control loop by means of the logic circuit ground translation and the application of open loop speed signals as illustrated in FIG. 3. It will be appreciated that both the open loop and reference signals may be applied at the same point in the system. Referring to FIG. 3, for example, it is apparent that the open loop speed signals applied in the seed error translator 97 may be added to and made a part of the speed command reference signals applied at input 93 of amplifier 91. The net effect of this would be that, with the speed signal at 92 at the desired level, an error signal equivalent to the open loop level would still exist at 96 in a direction calling for an increase in speed, which increase in speed the system would be unable to produce with the tractive effort scheduled by that error signal magnitude because of the load on the system. The result is that a positive tractive effort is scheduled although the speed signal at 92 is at the desired level.

These two functions have been illustrated separately, however, first for the reason that the explanation of the concept involved can be more clearly presented and, secondly, because separation of these functions may in some cases be desirable in order to permit independent adjustment of the speed references and the open loop signals, which adjustability is provided for in the circuitry illustrated. The same is true, of course, in the case of the positioned stop references and open loop signals in the system illustrated in FIG. 4.

Zero/positioned stop operation

As indicated, hereinbefore, the system of this invention can accommodate any of a wide variety of signalling arrangements including, for example, the conventional block-type signalling systems of train separation. Since in a high speed system a distance of 1500 feet or more may be required for a normal station stop, the positioned stop zone must be at least that long. Close headway requirements for a high performance system, however, might require blocks in the vicinity approaching stations to be shorter than this distance and thus two or more train separation blocks might exist in the area of approach to a station. These blocks must be capable of providing a positioned stop indication or a zero speed indication. In this case, however, the zero speed indication must carry with it the intelligence that the train is in the area of a positioned stop zone. Accordingly, where the system is to function with the conventional block-type signalling system and the positioned stop zone is broken into several parts, the zero speed command becomes the zero/positioned stop command.

Reception of the zero/positioned stop command signal by the running command receiver through pickups 10 and 11 causes actuation of contacts 16a and 16b in selector 16. The actuation of contacts 16a and 16b causes energization of the running command presence relay RCPR and the positioned stop program relay PPR. Movement of contact 16b to the left, however, to energize relay PPR also causes the remove stop relay RSR to be de-energized.

When remove stop relay RSR is de-energized, contacts $RSR_1$ and $RSR_2$ in the speed command reference and speed-error translator circiuts, respectively, are opened to remove the speed reference voltage from the input 93 of amplifier 91 and the open loop speed signals from input 99 of amplifier 98. At the same time, since positioned stop program relay PPR is energized, contacts $PPR_1$ and $PPR_2$ are actuated. Thus, $PPR_1$ closes to connect the speed signal at 105 to the square function generator 107 to initiate generation of the positioned stop program. Also, contact $PPR_2$ moves to the lefthand position to connect the speed signal at 106 to the integrating amplifier 108 and disconnect the voltage reference terminal 120 from the capacitor 115 leaving the initial charge thereon and beginning the computation of the actual distance remaining to the stopping point.

Also, since the remove stop relay RSR has been de-energized by actuation of contact 16b in zero/positioned stop selector 16, the signal on line 104 is disconnected from the propulsion and braking controls. For example, line 104 which was connected through positioned stop relay contact PSR and contact RSR to the line 131, which is in turn connected to the line 132 and the propulsion and braking controls through the contacts $AER_2$ and MHS (FIG. 6 is now disconnected from line 131 since RSR relay is deenergized. From the foregoing description, therefore, it will be apparent that reception of a zero/positioned stop command signal sets up and begins operation of the positioned stop command circuitry while the propulsion and braking controls respond to the zero speed command.

It is to be understood that the zero/positioned stop command is not required in all applications, although its need arises from the fact set forth above with respect to the block-type signal system. Thus, for example, the zero/positioned stop command signal would not be required where a continuous ranging signal is provided to measure the distance between trains, such as the ranging system described and claimed in application Ser. No. 297,789 filed July 26, 1963, and assigned to the same assignee as the present invention.

In the system of that application, a continuous carrier modulated wave is caused to be propagated in one direction along a transmission line and caused to be reflected toward the source by a reflecting device remote in the direction of propagation from the wave source. The system includes means for simultaneously and continuously extracting first and second signals from the transmitted and reflected wave energies respectively. The first and second signals are then phase compared to obtain a continuous signal representative of the distance between the signal extracting means and the wave reflecting means.

In the foregoing specification a simplified specific embodiment of the invention for providing automatic vehicle operation has been illustrated and described in order to more clearly and completely teach the concepts, principles and method of operation thereof. From this description it will be apparent that the specific arrangements shown and described for providing the various system functions are exemplary only. Thus, for example, the communication link between the wayside and vehicle although preferably provided by means of an inductive carrier type ("wired radio") system may be provided by space radio, track signalling or any other suitable means.

Also, it will be appreciated by those skilled in the art that other arrangements for developing the so-called distance-error signal in accordance with the relationship $$a_{\text{(instantaneous)}} = v\frac{dv}{ds}$$

are suitable for use with the present invention; one such arrangement, for example, being described and claimed in the co-pending application entitled "Terminal Condition Predictive Control," Ser. No. 332,758, filed Dec. 23, 1963 now Patent No. 3,277,355 and assigned to the same assignee as the present invention.

The system of this invention, therefore, employs vehicle-carried apparatus to accomplish the necessary computing and regulating functions, as well as receiving command signals from wayside, in order to provide for the completely automatic operation of the vehicle. Such a system is to be distinguished, therefore, from remote control type systems or other systems wherein the vehicle is a slave to wayside signalling apparatus. Moreover, the system of this invention provides for starting, running and accurate stopping of the vehicle at a desired location in a completely automatic manner and makes possible the achievement of high vehicle operating performance together with passenger comfort. The system also allows the full capabilities of the propulsion and braking systems to be utilized to reduce both operating and maintenance costs and greatly increasing over-all operating performance.

While there has been shown and described the fundamental novel features of the invention as applied to a simplified specific embodiment thereof, many changes, additions and modifications in both arrangements and operation as well as in system sophistication will occur to those skilled in the art. It is to be understood, therefore, that the appended claims are intended to cover all such changes, additions and modifications as fall within the true spirit and scope of the invention.

What we claim as new and desire to secure by Letters Patent of the United States is:

1. An automatic control system for vehicles comprising:
    (a) means for deriving an electrical error signal having a characteristic which varies as a function of the difference between a desired and an actual vehicle speed;
    (b) means for generating an open-loop signal adapted to schedule vehicle traction to maintain the desired vehicle speed under nominal conditions; and
    (c) means responsive to the sustained application of said open-loop speed signal and said error signal for producing a control signal operative to cause said vehicle traction to be varied above and below said open-loop level as a function of said error signal to maintain said desired speed.

2. The automatic control system of claim 1 wherein additional means are provided for translating said control signal above a point of reference potential so that all variations in the magnitude and polarity thereof are exhibited as different signal levels above said point of reference potential.

3. An automatic control system for vehicles comprising:
    (a) means carried by said vehicle for establishing specific speed reference signals from received wayside signals;
    (b) means for developing a signal representative of actual vehicle speed;
    (c) means for comparing said speed reference signal and said actual speed signal to develop a speed-error signal;
    (d) means responsive to said received wayside signal for generating an open loop speed signal adapted to schedule vehicle traction to maintain said reference speed under nominal conditions;
    (e) and means responsive to said open loop speed signal and said speed-error signal for producing a control signal operative to cause said vehicle traction to be varied above and below said open loop level to maintain said reference speed.

4. The automatic control system of claim 3 wherein additional means are provided for translating said control signal above a point of reference potential so that all variations in the magnitude and polarity thereof are exhibited as different signal levels above said point of reference potential.

5. An automatic control system for vehicles comprising:
    (a) means carried by said vehicle for establishing speed reference signals from received wayside signals;
    (b) means associated with said vehicle for developing a signal proportionate to the actual speed of said vehicle;
    (c) means responsive to said actual speed signal and said speed reference signal for deriving a speed-error signal having positive and negative excursions with respect to a first point of reference potential;
    (d) traction control means for varying the braking and propulsion effort of said vehicle;
    (e) means responsive to said received wayside signals for generating an open loop speed signal adapted when applied to said traction control means to schedule a vehicle traction to maintain said reference speed under nominal conditions;
    (f) means responsive to said speed-error signal and said open loop signal for producing a control signal operative to cause said vehicle traction to be varied above and below said open loop level and wherein all variations in magnitude and polarity of said control signal are exhibited as different levels above a second point of reference potential;
    (g) and means applying said control signal to said traction control means, said braking and propulsion control means being arranged with respect to said second point of reference potential so that a control signal level at said second point of reference potential schedules maximum braking effort with increasing control signal level being operative to schedule reduced braking effort and on up to maximum propulsive effort.

6. An automatic control system for vehicles comprising:
    (a) means carried by said vehicles for developing a signal representative of actual vehicle speed;
    (b) means carried by said vehicle for receiving signals representing a distance to a desired vehicle stopping point;
    (c) first and second circuit means;
    (d) means responsive to said received wayside distance signals for causing said actual vehicle speed signal to actuate said first and second circuit means,
        said first circuit means being responsive to said applied actual speed signal for causing a preselected speed-distance program signal to be generated,
        said second circuit means being responsive to said applied actual speed signal for causing generation of a signal representing the actual distance of said vehicle to said desired stopping point;
    (e) means for comparing the signals generated by said first and second circuit means to develop a distance-error signal;
    (f) means for generating an open loop braking rate signal adapted to schedule vehicle traction to stop said vehicle at said desired point under nominal conditions;
    (g) and means responsive to said open loop braking rate signal and said distance error signal for producing a control signal operative to cause said vehicle traction to be varied above and below said open loop level to cause said vehicle to be stopped at the desired point.

7. The automatic control system of claim 6 wherein additional means are provided for translating said control signal above a point of reference potential so that all variations in the magnitude and polarity thereof are exhibited as different signal levels above said point of reference potential.

8. An automatic control system for vehicles having vehicle-carried apparatus comprising: means for selectively receiving speed and distance command signals representative, respectively, of permissible vehicle speed and distance to a predetermined stopping point; first circuit means responsive to the application of a received speed command signal and a signal proportional to actual vehicle speed for developing a speed-error signal; second circuit means actuated in response to reception of a distance command signal and being responsive to a signal proportional to actual vehicle speed for developing a distance-error signal, said speed and distance error signals being arranged to have polarity and magnitude with respect to a first point of reference potential; third circuit means responsive to the application of one of said speed and distance error signals for deriving a control signal operative to cause said vehicle traction to be varied above and below said open loop level, said control signal having a magnitude with respect to a second point of reference potential which is determined by the magnitude of said open loop signal and by both the polarity and magnitude of the error signal so that all variations in the magnitude and polarity of said control signal are exhibited as different signal levels above said second point of reference potential; traction control means for varying the propulsion and braking effort applied to said vehicle; a plurality of selector means each adapted when actuated to schedule a specific vehicle traction and being selectively responsive to the magnitude of said control signal with respect to said second point of reference potential; and means selectively responsive to the reception of said speed command and distance command signals for applying a respective one of said speed and distance error signals to said third circuit means to provide a control signal operative to schedule vehicle traction in accordance with the magnitude of the control signal.

9. In an automatic control system, vehicle-carried apparatus for automatically operating railway vehicles in accordance with transmitted wayside command signals representing specific vehicle operating conditions comprising:
(a) means for receiving the wayside command signals;
(b) a plurality of separate channels each including output means operative when actuated to schedule a specific vehicle operating condition;
(c) means for directing the output of said receiving means to one of said channels selected in accordance with the specific command signal received;
(d) traction control means for varying the propulsion and braking effort applied to said vehicle;
(e) means responsive to actuation of the output means of certain of said channels occasioned by reception of speed command signals assigned thereto for establishing specific speed reference signals and open-loop speed signals, said open-loop speed signals being adapted to schedule a vehicle traction to maintain said reference speed under nominal conditions;
(f) means for producing a signal proportional to the actual speed of said vehicle;
(g) means responsive to said reference speed signal and said signal proportional to actual vehicle speed for developing a speed-error signal;
(h) means responsive to said open-loop speed signal and said speed-error signal for producing a speed control signal operative when applied to said traction control means to cause the vehicle traction to be varied above and below said open-loop level to maintain said reference speed;
(i) means responsive to said signal proportional to actual vehicle speed for deriving a distance-error signal in accordance with the difference between a generated programmed distance signal and a computed actual distance signal, said generated programmed distance signal being produced in accordance with the relationship $$a_{(instantaneous)} = v \frac{dv}{ds}$$

where
$a$=instantaneous acceleration
$v$=actual vehicle velocity
$s$=distance;

(j) means responsive to actuation of the output means of another of said channels occasioned by reception of a stop-command signal for establishing a preselected open loop braking rate signal adapted to schedule vehicle traction to stop said vehicle at the preselected point under nominal conditions and for also initiating operation of said distance-error deriving means;

(k) means responsive to said open-loop braking rate signal and said distance-error signal for producing a distance control signal operative when applied to said traction control means to cause the vehicle traction to be varied above and below said open-loop braking rate level to cause said vehicle to come to a stop at the preselected point;
(l) and means selectively responsive to reception of one of said speed command signals or a stop command signal for causing the speed-control signal or the distance-control signal to be applied to said traction control means so that the vehicle traction is controlled in accordance therewith to maintain said vehicle at a given speed or stop said vehicle at a preselected point respectively.

10. The automatic control system of claim 9 wherein additional means are provided for translating said speed-control and distance-control signals above a point of reference potential so that all variations in the magnitude or polarity thereof are exhibited as different signal levels above said point of reference potential.

11. An automatic control system for vehicles including vehicle carried apparatus comprising:
(a) means for producing a signal proportional to the actual speed of said vehicle;
(b) means responsive to a received permissible speed signal from wayside and said actual speed signal for producing a speed-error signal;
(c) means responsive to said received permissible speed signal for establishing an open-loop speed signal;
(d) traction control means for varying the propulsion and braking effort applied to said vehicle;
(e) means responsive to said speed-error signal and said open-loop speed signal for producing a control signal adapted to schedule vehicle traction which varies above and below the level established by said open loop signal;
(f) and means for applying said control signal to said control means with respect to a point of reference potential so that a control signal level at said reference potential schedules maximum braking effort with control signal levels above said point of reference potential being arranged to schedule a tractive effort approaching full propulsion power.

12. In an automatic control system for vehicles, vehicle-borne apparatus comprising:
(a) receiving means for collecting, selecting and translating wayside command signals representative of a permissible vehicle speed or a distance to a desired stopping point to provide electric signals establishing
  (1) a specific speed reference signal and a specific open loop traction signal, or
  (2) a specific open loop traction signal only depending upon whether the received signal is a speed command or distance signal;
(b) means for providing a signal proportional to actual vehicle speed;
(c) first and second circuit means for producing first and second error signals representing the difference between the actual and permissible vehicle speed and the difference between a programmed distance signal and a computed actual distance signal respectively;
(d) means for combining said first and second error signals respectively with specific open loop traction signals to provide first and second traction control signals operative to cause the vehicle traction to be varied above and below the specific open loop traction signal level;
(e) traction control means for varying the propulsion and braking effort applied to said vehicle;
(f) and means selectively responsive to the presence of permissible speed command signals or distance signals for respectively causing one of said first and second traction control signals to be applied to said traction controls means to provide for vehicle operation at said permissible speed or stop said vehicle at the desired stopping point respectively.

13. The automatic control system of claim 12 wherein said second circuit means includes means responsive to said signal proportional to actual vehicle speed for deriving an error signal in accordance with the difference between a generated programmed distance signal and a computed actual distance signal, said programmed distance signal being produced in accordance with the relationship $$a_{(instantaneous)} = v\frac{dv}{ds}$$

where $a$ = instantaneous acceleration
$v$ = actual vehicle velocity
$s$ = distance.

14. The automatic control system of claim 12 wherein said traction control means is continuously responsive to the magnitude of the traction control signal applied thereto to schedule vehicle traction in accordance therewith.

15. The automatic control system of claim 12 wherein said second circuit means further includes means responsive to specific reference distance signals for resetting the means providing the computed actual distance signal to bring said computed signal into conformance with said actual distance.

16. The automatic control system of claim 12 wherein means are provided for translating said first and second traction control signals above a point of reference potential so that all variations in the magnitude and polarity thereof are exhibited as different signal levels above said point of reference potential.

17. The automatic control system of claim 16 wherein said first and second traction control signals are applied to said traction control means so that said traction control means is operative to schedule full braking effort for a zero level control signal with respect to said point of reference potential and full propulsion effort for a maximum level control signal with respect thereto and intermediate braking or propulsion effort for control signal levels therebetween.

18. The automatic control system of claim 16 wherein said traction control means comprises a first portion continuously responsive to variations in the magnitude of the control signal applied thereto and a second portion including a plurality of separate voltage-level responsive selectors arranged to be sequentially actuated with increasing control signal level with respect to said point of reference potential.

19. The automatic control system of claim 16 wherein said traction control means includes a plurality of separate selector means each adapted when actuated to schedule a different vehicle traction, each of said selector means being arranged with respect to said point of reference potential to be sequentially actuated with increasing magnitude of said control signals applied thereto with respect to said point of reference potential.

20. The automatic control system of claim 19 wherein said selector means are arranged so that maximum braking effort is scheduled when none of said selectors are actuated and maximum propulsion effort is scheduled when all of said selectors are actuated.

21. In an automatic control system for vehicles, vehicle-borne apparatus comprising:
(a) receiver means for collecting, selecting and translating wayside command signals representative of a permissible vehicle speed into electric signals establishing
  (1) specific speed reference signals, and
  (2) specific open-loop traction signals adapted to schedule vehicle traction to maintain said reference speed under nominal conditions;
(b) means for providing a signal proportional to actual vehicle speed;
(c) means responsive to said speed reference signal and said signal proportional to actual vehicle speed to provide an open loop traction control signal off-set to said speed reference signal for maintaining said vehicle traction at the average level required to maintain said reference speed;
(d) traction control means for varying the braking and propulsion effort applied to said vehicle; and
(e) means applying said traction control signal to said traction control means.

22. The automatic control system of claim 21 wherein said traction control signal is translated above a point of reference potential so that all variations in the magnitude and polarity thereof are exhibited as different signal levels above said point of reference potential.

23. The automatic control system of claim 22 wherein said traction control means is sequentially responsive to increasing signal level above said point of reference potential.

24. The automatic control system of claim 22 wherein said traction control means includes a plurality of separate selector means each adapted to be actuated to schedule a different vehicle traction and arranged with respect to said point of reference potential to be sequentially actuated with increasing magnitude of said applied control signal with respect to said point of reference potential.

25. In a vehicle control system for vehicles, vehicle-borne apparatus comprising:
(a) receiver means for collecting, selecting and translating wayside command signals representative of a specific distance to a desired stopping point into electric signals establishing nominal open loop traction signals;
(b) means for providing a signal proportional to actual vehicle speed;
(c) means operated in response to reception of a distance command signal and responsive to said signal proportional to actual vehicle speed for deriving a signal representing the difference between the actual distance to said desired stopping point and a distance generated in accordance with the relationship $$a_{(instantaneous)} = v\frac{dv}{ds}$$

where
  $a$ = instantaneous acceleration
  $v$ = actual vehicle velocity
  $s$ = distance
and being arranged to establish a traction control signal which varies above and below said open loop traction signal to schedule vehicle traction to bring said vehicle to a stop at said desired point in a minimum time and at optimum rate;
(d) traction control means for varying the braking and propulsion effort applied to said vehicle;
(e) and means applying said traction control signal to said traction control means for scheduling vehicle traction is accordance with said control signal.

26. The automatic control system of claim 25 wherein said traction control means is continuously responsive to said traction control signal to vary the vehicle traction continuously in accordance therewith.

27. The automatic control system of claim 25 wherein said traction control signal is translated above a point of reference potential so that all variations in the magnitude and polarity thereof are exhibited as different signal levels above said point of reference potential.

28. The automatic control system of claim 27 wherein said traction control means comprises a plurality of separate selector means each adapted to be actuated to schedule a different vehicle traction and being arranged with respect to a point of reference potential to be sequentially actuated with increasing magnitude of said applied control signal with respect to said point of reference potential.

29. In an automatic control system for vehicles, vehicle-borne apparatus comprising:
(a) traction control means for varying the braking and propulsion effort applied to said vehicle;
(b) receiver means for collecting, selecting and translating wayside command signals representative of a specific distance to a desired stopping point into electric signals establishing specific nominal open loop traction signals adapted when applied to said traction control means to schedule vehicle traction to bring said vehicle to a stop at the desired point under nominal conditions;
(c) means for producing a signal proportional to actual vehicle speed;
(d) means caused to be operated in response to reception of a distance signal and responsive to said signal proportional to actual vehicle speed for deriving an error signal representing the difference between a computed actual distance remaining to said desired stopping point and the programmed distance remaining, which program is generated in accordance with the relationship $$a_{(instantaneous)} = v\frac{dv}{ds}$$

where
$a$ = instantaneous acceleration
$v$ = actual vehicle velocity
$s$ = distance (e) means for combining said error signal and said open-loop traction signal to provide a traction control signal which varies above and below said open-loop traction signal;
(f) and means applying said traction control signal to said traction control means to cause scheduling of vehicle traction to bring said vehicle to a stop at said desired point in a minimum time and at a preselected rate.

30. The automatic control system of claim 29 wherein said traction control signal is translated above a point of reference potential so that all variations in the magnitude and polarity thereof are exhibited as different signal levels all of which are above said point of reference potential.

31. The automatic control system of claim 30 wherein said traction control means includes a plurality of separate selector means arranged to be sequentially responsive to increasing control signal level above said point of reference potential.

32. The automatic control system of claim 30 wherein said traction control system is continuously responsive to the magnitude of said traction control signal and arranged to provide for the application of maximum braking effort at zero signal level and maximum propulsion effort at maximum signal level.

References Cited

UNITED STATES PATENTS

| | | | |
|---|---|---|---|
| 2,768,331 | 10/1956 | Cetrone | 246—187 |
| 2,911,077 | 11/1959 | Carter | 246—187 |
| 3,041,449 | 6/1962 | Bingen | 246—182 |
| 3,070,185 | 12/1962 | Fales | 180—82.1 |
| 3,116,807 | 1/1964 | Wilson | 180—82.1 |
| 3,172,497 | 3/1965 | Stoner et al. | 180—82.1 |
| 3,218,454 | 11/1965 | Hughson | 246—187 |
| 3,240,929 | 3/1966 | Hughson | 246—187 |
| 3,253,143 | 5/1966 | Hughson | 246—187 |

OTHER REFERENCES

Railway Gazette—Automatic Control of Braking, Oct. 16, 1964, pp. 859–862 and 864, copy in 246–182.

Railway Signaling and Communications—San Francisco will test four ATO systems, September 1964, pp. 13–17, copy in 246–187.

ARTHUR L. LA POINT, *Primary Examiner.*

S. B. GREEN, *Assistant Examiner.*